(12) United States Patent
Hinckley et al.

(10) Patent No.: US 11,550,404 B2
(45) Date of Patent: Jan. 10, 2023

(54) TILT-RESPONSIVE TECHNIQUES FOR SHARING CONTENT

(71) Applicant: Microsoft Technology Licensing, LLC, Redmond, WA (US)

(72) Inventors: Kenneth P. Hinckley, Kirkland, WA (US); Michel Pahud, Kirkland, WA (US); Nathalie M. Riche, Issaquah, WA (US); Molly Nicholas, Berkeley, CA (US); Chunjong Park, Seattle, WA (US); Nicolai Marquardt, Stevenage (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/321,107

(22) Filed: May 14, 2021

(65) Prior Publication Data

US 2022/0365606 A1    Nov. 17, 2022

(51) Int. Cl.
*G06F 3/03*     (2006.01)
*G01B 5/24*     (2006.01)
(Continued)

(52) U.S. Cl.
CPC .............. *G06F 3/03* (2013.01); *G01B 5/24* (2013.01); *G06F 3/017* (2013.01); *G06F 3/0482* (2013.01); *H04L 65/401* (2022.05)

(58) Field of Classification Search
CPC .......... G06F 3/03; G06F 3/017; G06F 3/0482; G01B 5/24; H04L 65/4007
See application file for complete search history.

(56) References Cited

U.S. PATENT DOCUMENTS 6,545,669 B1 * 4/2003 Kinawi ................ G06F 3/1438
  345/173
8,253,649 B2 * 8/2012 Imai .................... G06F 3/011
  345/1.3

(Continued)

FOREIGN PATENT DOCUMENTS

EP     2797280 A1    10/2014

OTHER PUBLICATIONS

"Invitation to Pay Additional Fees Issued in PCT Application No. PCT/US22/025859", dated Jul. 19, 2022, 17 Pages.

*Primary Examiner* — Benyam Ketema

(57) ABSTRACT

Methods and systems are disclosed for sharing a content item from a secondary computing device to a primary computing device based on a tilt position of the secondary computing device. A sensor on the secondary computing device determines that the secondary computing device has a first tilt position that is associated with a non-sharing mode. The sensor senses that the secondary computing device is tilting from the first tilt position towards a second tilt position that is associated with a full sharing mode. In response, the content item is begun to be shared with the primary computing device. An amount of the content item that is shared with the primary computing device is continued to be increased as long as the sensor continues to sense that the secondary computing device is tilting from the first tilt position towards the second tilt position. The sensor senses that the secondary computing device has reached the second tilt position and shares the entire content item with the primary computing device.

20 Claims, 26 Drawing Sheets

(51) Int. Cl.
*G06F 3/01* (2006.01)
*G06F 3/0482* (2013.01)
*H04L 65/401* (2022.01)

(56) References Cited

U.S. PATENT DOCUMENTS

| | | | | |
|---|---|---|---|---|
| 8,266,551 B2* | 9/2012 | Boldyrev | ................ | G06F 9/542 |
| | | | | 715/702 |
| 8,823,637 B2* | 9/2014 | Iwase | ..................... | G06F 3/038 |
| | | | | 715/863 |
| 8,836,718 B2* | 9/2014 | Choi | ..................... | G06F 3/0484 |
| | | | | 345/173 |
| 8,839,150 B2* | 9/2014 | King | .................. | G06F 3/04883 |
| | | | | 715/837 |
| 8,872,727 B2* | 10/2014 | Reeves | .................. | H05K 13/00 |
| | | | | 345/173 |
| 9,298,362 B2* | 3/2016 | Lucero | ............... | H04N 21/4126 |
| 9,400,628 B2* | 7/2016 | Matsubara | ............ | G06F 3/0484 |
| 9,710,128 B2* | 7/2017 | Kauffmann | ......... | G06F 3/04883 |
| 2005/0219211 A1* | 10/2005 | Kotzin | .................. | G06F 1/1684 |
| | | | | 345/158 |
| 2005/0219223 A1* | 10/2005 | Kotzin | .............. | H04M 1/72454 |
| | | | | 345/173 |
| 2006/0094480 A1* | 5/2006 | Tanaka | .................. | G06F 1/1616 |
| | | | | 248/346.06 |
| 2006/0146765 A1* | 7/2006 | Van De Sluis | ......... | H04L 67/04 |
| | | | | 370/338 |
| 2006/0294247 A1* | 12/2006 | Hinckley | ................ | G06F 3/038 |
| | | | | 709/228 |
| 2009/0017799 A1* | 1/2009 | Thorn | ................ | H04M 1/72412 |
| | | | | 455/414.1 |
| 2010/0156812 A1* | 6/2010 | Stallings | ........... | H04M 1/72412 |
| | | | | 345/173 |
| 2010/0167646 A1* | 7/2010 | Alameh | ................. | H04W 12/06 |
| | | | | 455/41.2 |
| 2010/0257251 A1* | 10/2010 | Mooring | ................. | H04W 4/21 |
| | | | | 709/216 |
| 2011/0148789 A1* | 6/2011 | Kim | ....................... | G03B 21/26 |
| | | | | 345/173 |
| 2011/0163944 A1* | 7/2011 | Bilbrey | ................. | G06F 1/1626 |
| | | | | 715/863 |
| 2011/0239114 A1* | 9/2011 | Falkenburg | ......... | G06F 3/04883 |
| | | | | 715/810 |
| 2012/0206319 A1* | 8/2012 | Lucero | ............ | H04N 21/41407 |
| | | | | 345/1.3 |
| 2014/0333530 A1* | 11/2014 | Agnetta | ............ | G06Q 30/0631 |
| | | | | 345/156 |
| 2015/0029093 A1* | 1/2015 | Feinstein | ................ | E21B 47/13 |
| | | | | 345/156 |
| 2015/0294645 A1* | 10/2015 | Tagaya | ................ | G06F 3/04845 |
| | | | | 345/173 |
| 2017/0108936 A1* | 4/2017 | Feinstein | ............. | G06F 3/0346 |
| 2017/0242646 A1 | 8/2017 | Lee et al. | | |
| 2018/0104573 A1* | 4/2018 | Jeffery | .................... | A63F 13/35 |
| 2020/0249763 A1* | 8/2020 | Moritani | ................ | G06F 1/1694 |

* cited by examiner

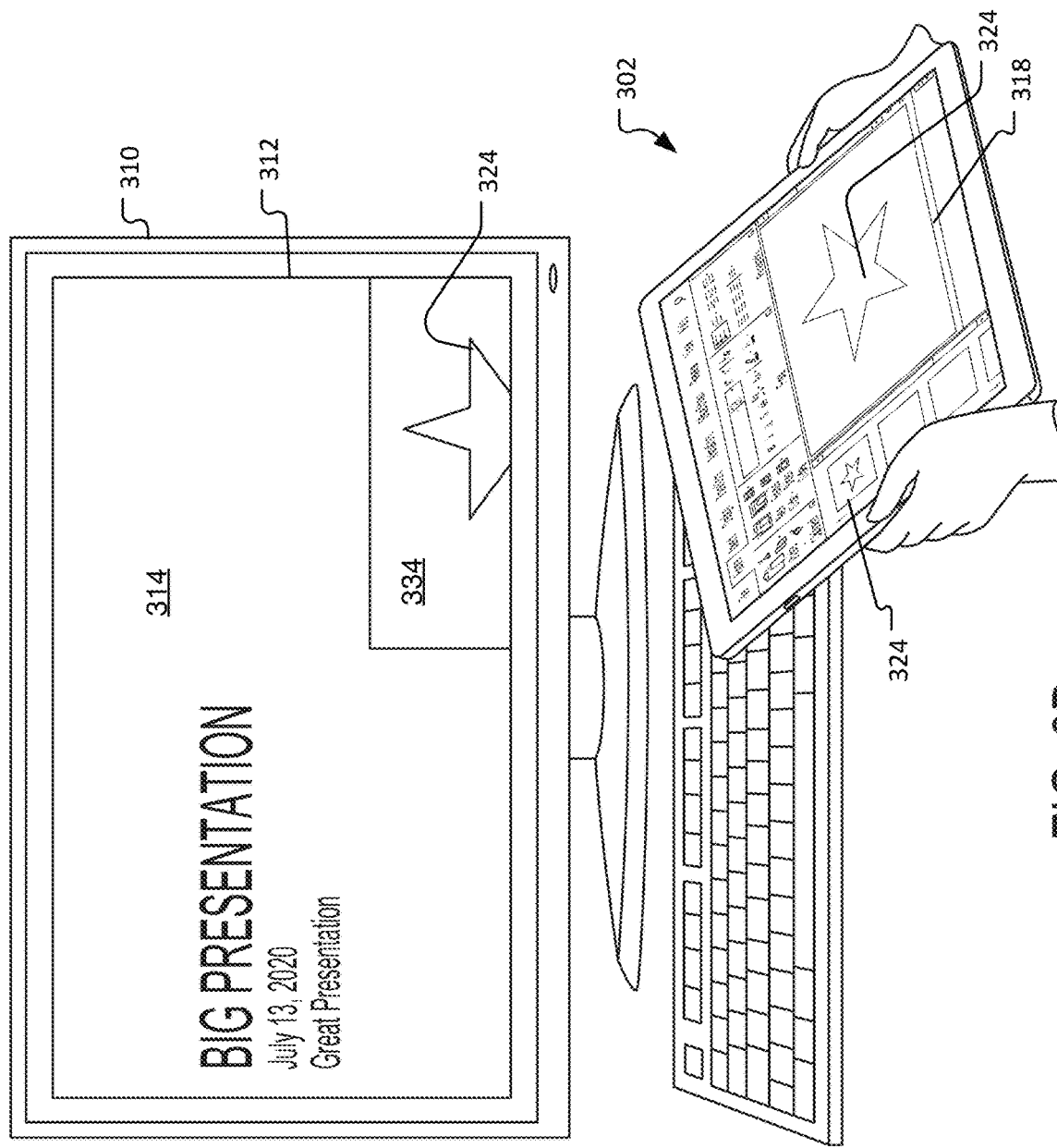
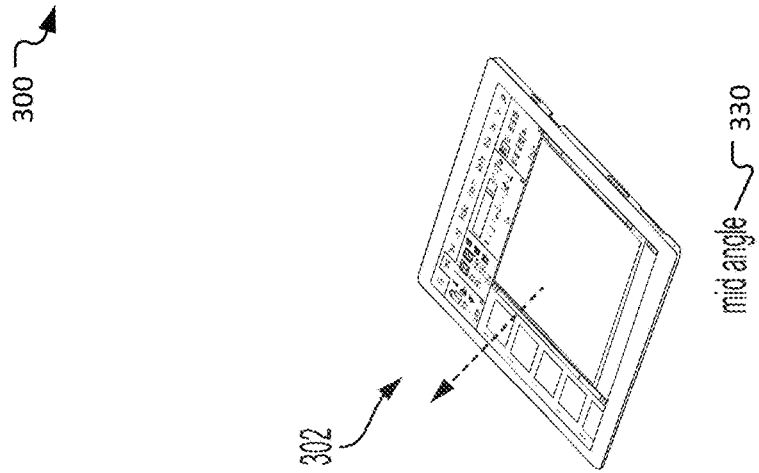
FIG. 3B

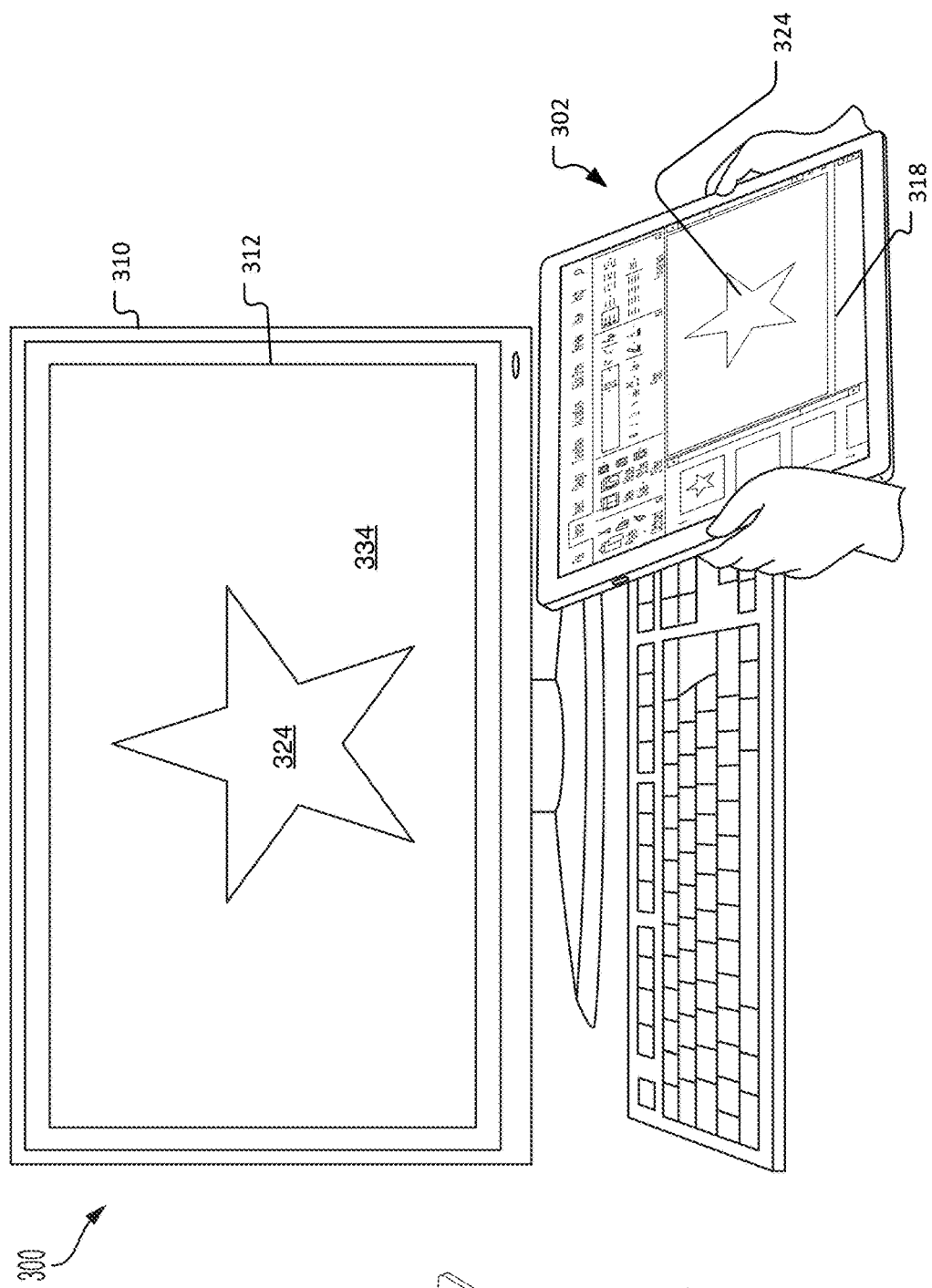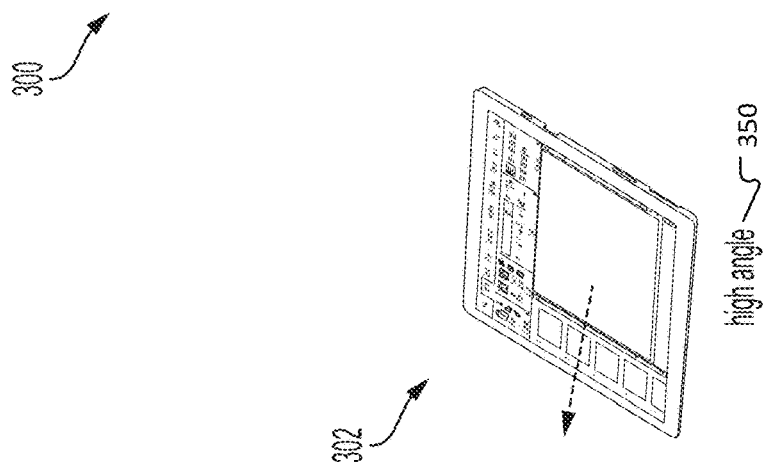
FIG. 3C

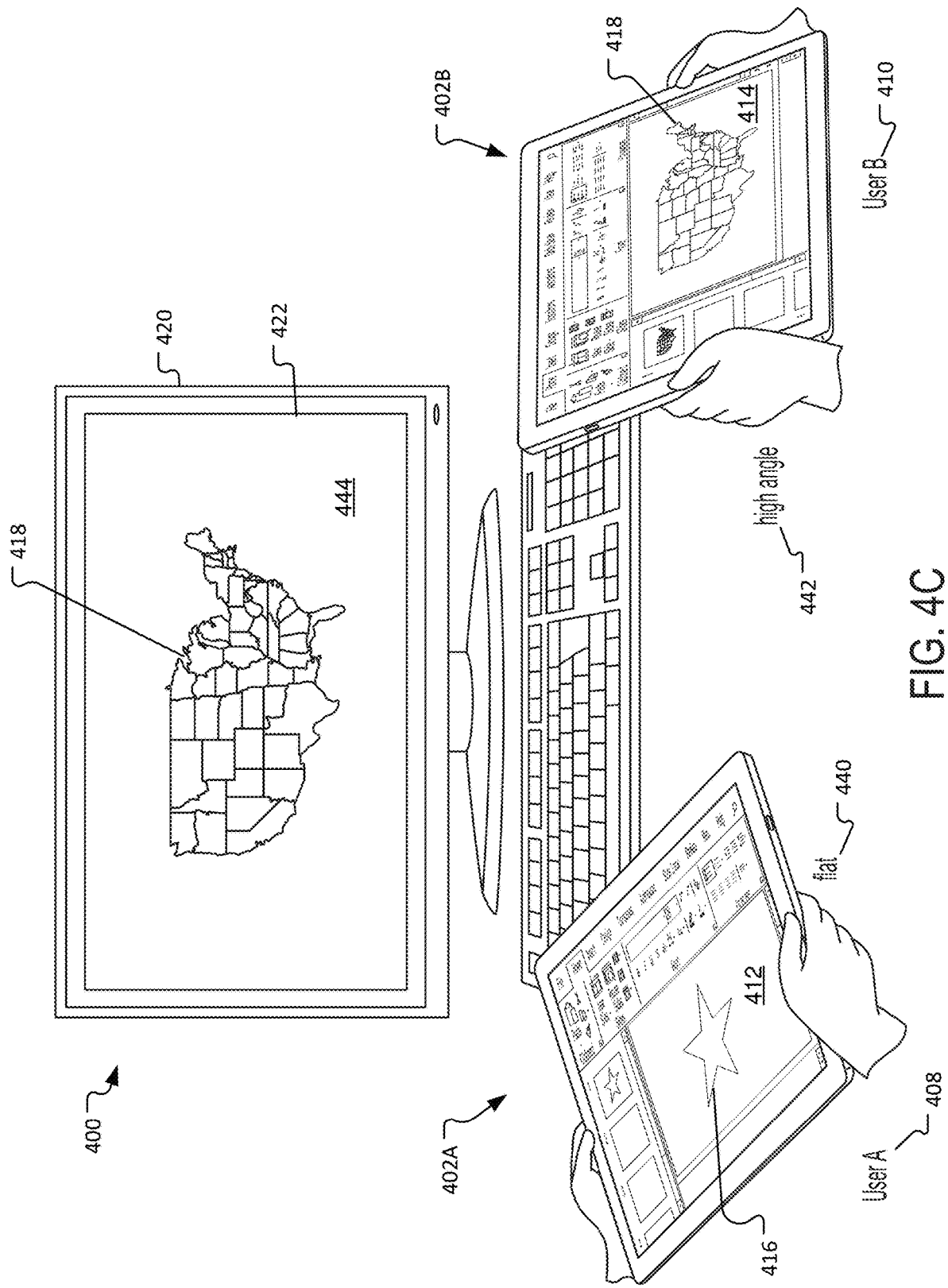

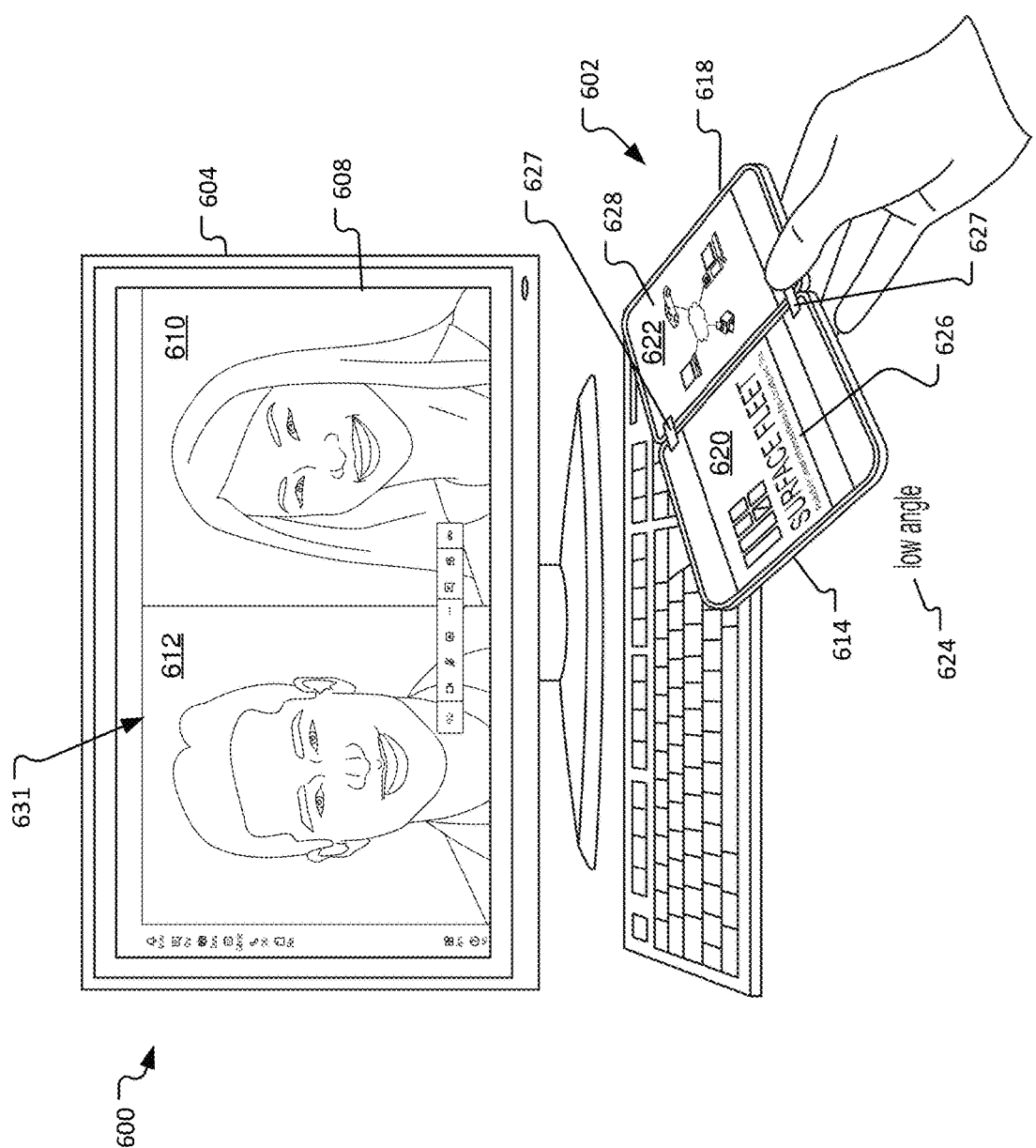

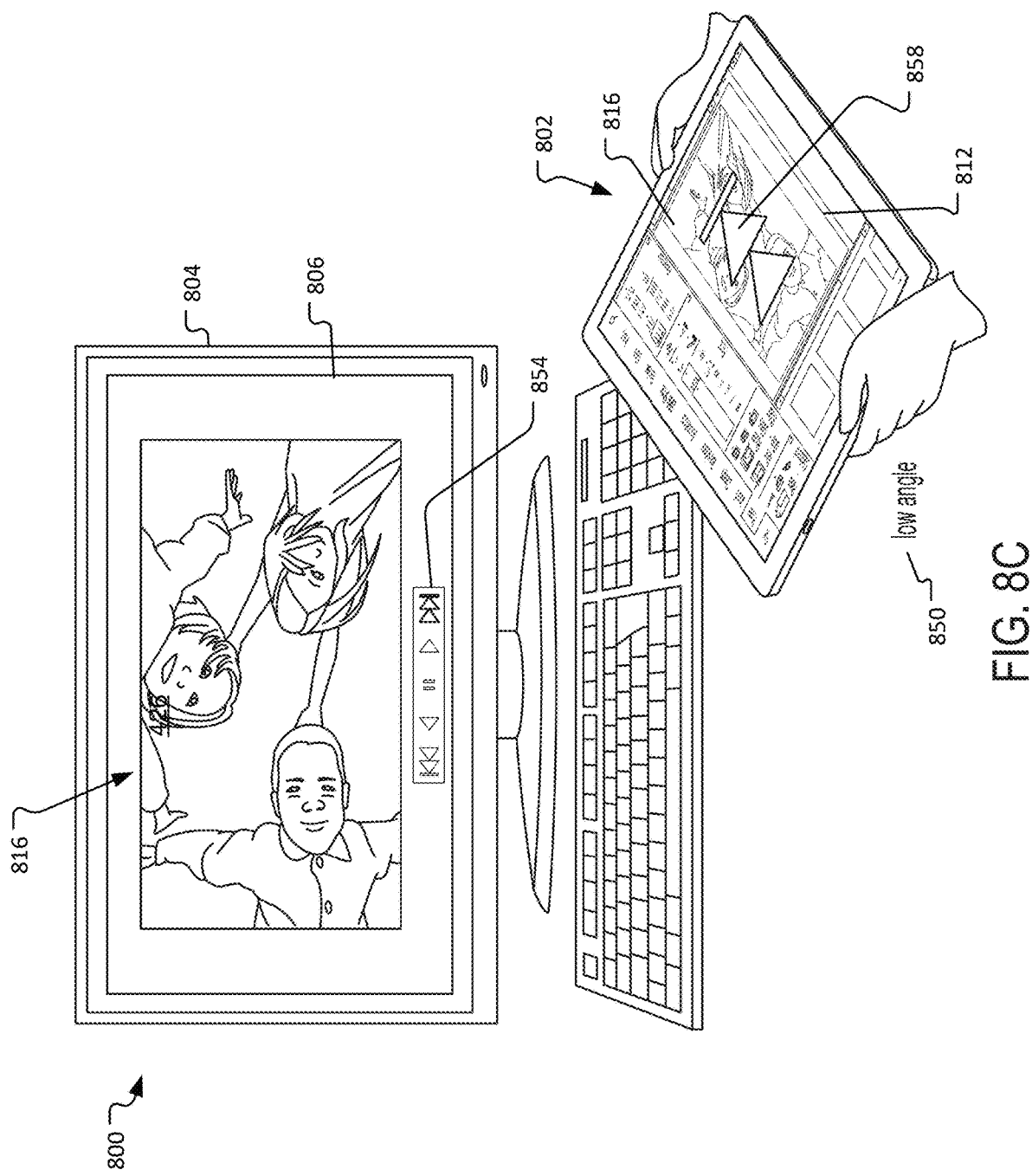

TILT-RESPONSIVE TECHNIQUES FOR SHARING CONTENT

BACKGROUND

Sharing additional digital content with other users during an online collaboration session, such as a videoconference call or an online presentation, can be time consuming, prone to errors, and generally diverts attention away from the collaboration particularly for the user who intends to share the additional content. For example, initiating screen sharing in a videoconference call, while ostensibly done at the click of the button, actually is highly error prone and is difficult to initiate while also engaged in a conversation. Clicking on the screen share button requires visual attention to the button and then further visual attention to select which content the user wishes to share, and is easy to miss especially if new to the application. Indeed, users risk sharing the wrong content if they make an incorrect selection. Further, the heavyweight and binary nature of turning sharing "on" or "off" means that users are hesitant to enter a screen sharing mode in the first place, but when they do so, they tend to leave screen-sharing on even when the conversation has moved away from the shared content itself, and it would be more desirable to revert back to the "person space" of the stage (e.g., video feeds).

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

A gesture-based, real-time sharing state that is proportional to a natural human gesture—tilting a physical artifact so that it is more easily observable to others nearby—offers gradations of sharing, faster sharing, and more socially nuanced and socially acceptable sharing than is possible with a Share Screen button or similar control. A secondary portable device may be used to host the content to be shared with a primary device that is displaying in a primary vertical orientation the main stage of the collaboration application, such as a videoconference, a presentation, or a shared whiteboard. The user may then easily select the particular content to share from the secondary device, and if the selected content is correct, share the content to the primary device by tilting the secondary device from one angle to another. This concept may be referred to as "tilt-to-share."

In accordance with examples of the present disclosure, methods and systems are provided that are directed to share content or stop sharing content based on a tilt position of a computing device. The computing device has at least one tiltable screen with a sensor. The sensor is used to determine that the computing device has been picked up by a user and to sense the tilt position of the computing device as well as changes to the tilt position of the computing device.

In aspects, a content item is shared from a secondary computing device or a tiltable screen to a primary computing device based on a tilt position of the secondary computing device. A sensor on the secondary computing device determines that the secondary computing device has a first tilt position that is associated with a non-sharing mode. The sensor senses that the secondary computing device is tilting from the first tilt position towards a second tilt position that is associated with a full sharing mode. In response, the content item begins to be shared with the primary computing device. An amount of the content item that is shared with the primary computing device is continued to be increased as long as the sensor continues to sense that the secondary computing device is tilting from the first tilt position towards the second tilt position. The sensor senses that the secondary computing device has reached the second tilt position and shares the entire content item with the primary computing device.

In other aspects, a system for sharing content with a primary device comprises a first computing device and a second computing device. The first computing device comprises a first sensor, a first processor; and first memory storing first computer executable instructions that when executed by the processor cause the first computing device to: use the first sensor on the first computing device to determine that the first computing device has a first tilt position, wherein the first tilt position is associated with a non-sharing mode; sense, by the first sensor, that the first computing device is tilting from the first tilt position towards a second tilt position, wherein the second tilt position is associated with a full sharing mode; and in response to sensing that the first computing device is tilting from the first tilt position towards the second tilt position, begin to share a first content item with the primary computing device. The second computing device comprises a second sensor, a second processor, and second memory storing second computer executable instructions that when executed by the processor cause the second computing device to: use the second sensor on the second computing device to determine that the second computing device has the first tilt position; sense, by the second sensor, that the second computing device is tilting from the first tilt position towards a second tilt position; and in response to sensing that the second computing device is tilting from the first tilt position towards the second tilt position, beginning to share a second content item with the primary computing device.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

FIGS. 3A-3C illustrate sharing content from a secondary device to a primary device using various tilt angles in accordance with examples of the present disclosure;

FIGS. 4A-4D illustrate sharing content from two secondary devices to a primary device using various tilt angles in accordance with examples of the present disclosure;

FIGS. 6A-6D illustrate sharing content from a secondary device to a primary device using various tilt angles in accordance with examples of the present disclosure;

FIGS. 8A-8C illustrate controlling an application on a primary device using a secondary device at various tilt angles in accordance with examples of the present disclosure;

DETAILED DESCRIPTION

Figure 1:
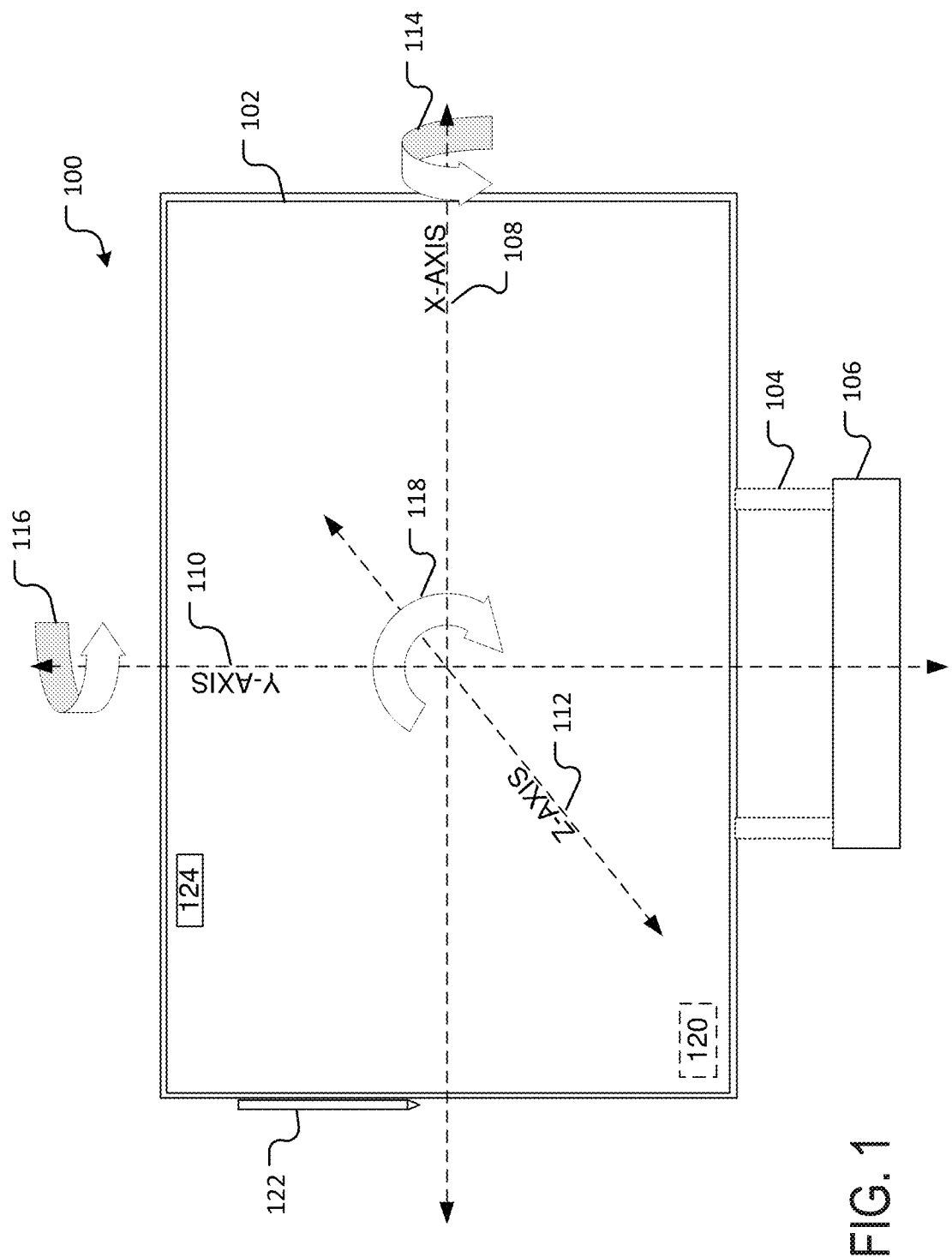
FIG. 1 shows details of tilt angles of a device about different axis's in accordance with examples of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The systems and methods described herein sense display postures for a device that is tiltable about at least one degree of freedom (e.g., tilt or rotation about the x-axis of a display) and the continuous transitions in-between. Although the discussion relates to tilt/rotation about one degree of freedom about the x-axis, this disclosure is not so limited. A device, such as a laptop computer, a digital drawing board, a mobile phone, or any other type of portable or mobile computing device, is fitted with a number of sensors including a tilt sensor (inertial motion, often embodied as 3d accelerometer, 3d gyroscope, and 3d magenetometer degrees-of-freedom), multi-modal inputs including direct touch, pen, or bimanual pen+touch input, as well as an embedded front-facing camera and microphone (or array microphone).

Systems and methods described herein allow a user to quickly share selected content from one device (e.g., a secondary mobile device) to another computing device (e.g., a primary device) and in aspects share content into an application running on the primary device, such as a collaboration application such as Microsoft® Teams™ or a presentation application such as Microsoft® PowerPoint®, in a real-time, moment-by-moment manner where "screen sharing" takes one second or less to access or modulate. For example, a user may join a video conference call with a secondary mobile device, where the secondary device is dedicated to content sharing. Various pieces of content are provided in a menu on the secondary device and can be easily and accurately selected and shared to the primary device in a nuanced manner by tilting the secondary device towards the main screen or "stage" of the primary device. As used herein, the term "menu" or "content menu" refers to any number of ways to make content available for navigation, display, and/or selection for sharing via the tilt-to-share gesture. For example, the secondary device may host a carousel-like application (e.g., a photo viewer menu) where a user simply swipes left/right or up/down to flip through content to be selected for sharing to the primary device or another device. In other aspects, the sharing application on the secondary device is instantiated as a multi-object synchronized clipboard where a user collects, gathers, and curates content before or even during a meeting/presentation. Multiple such clipboards may be created, displayed, and flipped through, for example, by representing each clipboard as a different "pile" or "sheaf" of documents/photos that the user can gather, and later tap on to maximize and swipe through to select content to be shared through tilt-to-share gestures.

In aspects, this is not binary on/off sharing. Rather the content moves on to, expands/shrinks, and/or fades into the primary device screen in a nuanced manner proportional to the degree of tilt of the secondary device. This is much more like socially natural sharing, such as showing a piece of paper to a person nearby, because there are partial sharing states where one can see the content starting to appear on the primary device screen, but it may not be fully "on-stage" yet. This makes it easy to back out of the sharing or change course (by reversing the tilt direction of the secondary device) if someone else starts speaking, to quickly cede the floor to another person, and so forth. The partially-faded-in intermediate sharing state is of its own use as well, such that one can see a collaborator and mutually point to portions of the partially-transparent shared content at the same time.

Further, this approach can scale to multiple participants or multiple pieces of content. For example, if two users start sharing content at the same time (e.g., each user has their own secondary device), both pieces of shared content can become larger on the primary device screen as they gradually move/fade on to the primary device screen based on the degree of tilt of each user's secondary device. Then one user or the other can easily cede the floor—or both users can continue sharing, creating a new and very simple to use side-by-side sharing mode where participants can compare notes and ideas. This sharing mode is not limited to two users.

Still further, this approach can scale to multiple primary devices of a single user or multiple secondary devices of a single user. For example, when a user tilts to share a slide from a secondary device, the slide may be shared with a first primary device and the slides notes associated with that slide may be shared with a second primary device of that user. In this scenario, the user's various primary and secondary devices are known to each other and trusted, which in aspects causes different behavior from the tilt-to-share gesture than what is caused with other devices belonging to other users.

In some variations a dual-screen secondary device like the Surface™ Duo™ can host two different pieces of content, one on each screen, which can be selectively shared to the primary device by tilting the secondary device towards the stage of the primary device while alternatively favoring the left or right screen of the device—or holding it in-air in a predominately horizontal posture to share both screens in the side-by-side sharing mode mentioned above.

There are different techniques for initiating the sharing state of the secondary device. In aspects, the secondary device could automatically be designated to play this role. In other aspects, tilt-to-share could be a mode that is switched on or off in an application view on the secondary mobile device, such as by swiping up (turn on) or down (turn off), or by holding a finger (or thumb) on the screen while tilting. In still other aspects, an initial action such as picking up the secondary device can trigger an on-screen affordance for sharing content, such as a touchscreen button similar to a camera app. But in all of these aspects, the tilting of the secondary device then allows a nuanced gradation of sharing (or not-sharing) the selected on-screen content of the secondary device.

Another aspect is special handling for a "flat" posture of the mobile device, i.e., when placed down on a stable supporting surface, as opposed to a "flat angle position" where the user is holding the device in a relatively horizontal position. A flat angle position inevitably has inadvertent motion associated with it, which is detectable through the inertial motion sensors, whereas placing the device actually flat on a desk is a stable, fixed orientation with little movement. It should be noted that the stable supporting surface does not need to be "flat" but could be located at an angle, such as with a podium. In some aspects, placing the secondary device on a stable supporting surface defaults to an unshared state so that the user can put the device down as an easy way to stop sharing. Hence, "pick up" and "put down" are sensed transitions that help determine the behavior of the sharing system.

The appearance and disappearance of the shared content can also have different manifestations. This can be in the form of full-scale fade in of the content, gradual scaling up of the content from an origin point that is on-screen or off-screen, or some combination of these behaviors (e.g. fade in and scale simultaneously). In aspects, the behavior may also be contingent on the number of shared content streams currently visible (e.g. 1 person sharing content vs. 2, 3, or more people trying to share at the same time).

In some aspects, the tilt-to-share capability can be tied to system elements, such as a shared clipboard.

Not that in remote collaboration (videoconferencing) contexts, there is a "local user" as well as a "remote user" view of the interaction. The local and remote views of how the content transfers to the primary device may differ depending on whether a user is the local user or remote user.

In addition to using tilt-to-share content into a videoconferencing application, the tilt-to-share systems and methods can also be used with virtually any other application running on the primary device. For example, when giving a PowerPoint™ presentation, tilting a secondary mobile device could be used to introduce ("fade in") content on top of the current slide being presented. This provides an eyes-free, more conversational way to introduce content in a way that can be revealed or pulled back on a moment-by-moment basis (by changing tilt-direction) while speaking. Or if a video is being played, the tilt could control playback speed, allowing one to easily scrub through the video, pause it, or even reverse easily by tilting the secondary device in the other direction or tilting it backwards while speaking over a video clip while giving a presentation.

Likewise, similar concepts could be used for sharing content onto a large whiteboard or other display in co-located collaboration scenarios. What is common is designating and using a secondary mobile device (phone, tablet, foldable, etc.) as a content providing device by tilting the secondary device in the manner described here.

In aspects, the tilt-to-share systems and methods may also be used for less mobile devices, such as digital drawing boards or laptop lids. A tilt-to-share option could also be provided so that "the current screen angle" (convenient for viewing) represents the non-sharing state, while more extreme angles moving away from that default orientation would begin to share the content, on devices with the ability to sense the laptop lid angle. In other aspects, a tertiary mobile device (e.g., a smartwatch, a smartphone, or tablet) could be paired with a less mobile or non-mobile secondary device such that tilting of the tertiary device may be used to initiate sharing of content on the secondary device to the primary device.

In aspects, the system might offer an option to choose whether automatic or semi-automatic transitions are the default. In still further aspects, the system might offer an option to turn off the tilt transitions, which might be particularly beneficial for mobile computing devices. Either way, the transition is gradual and moves as long as the tilt continues and stops when the tilt stops.

In yet other aspects, content from one device may be shared with another device through a swiping gesture, which might or might not be used in combination with a tilt-angle of the sharing device. For example, a user might select content to share and then use his or her finger to push (by moving the finger away from the user's body) the content toward the other device. Likewise, a user might select to pull content from a device, such as the primary device, by making an opposing swiping gesture (by moving a finger towards the user's body).

Figure 2:
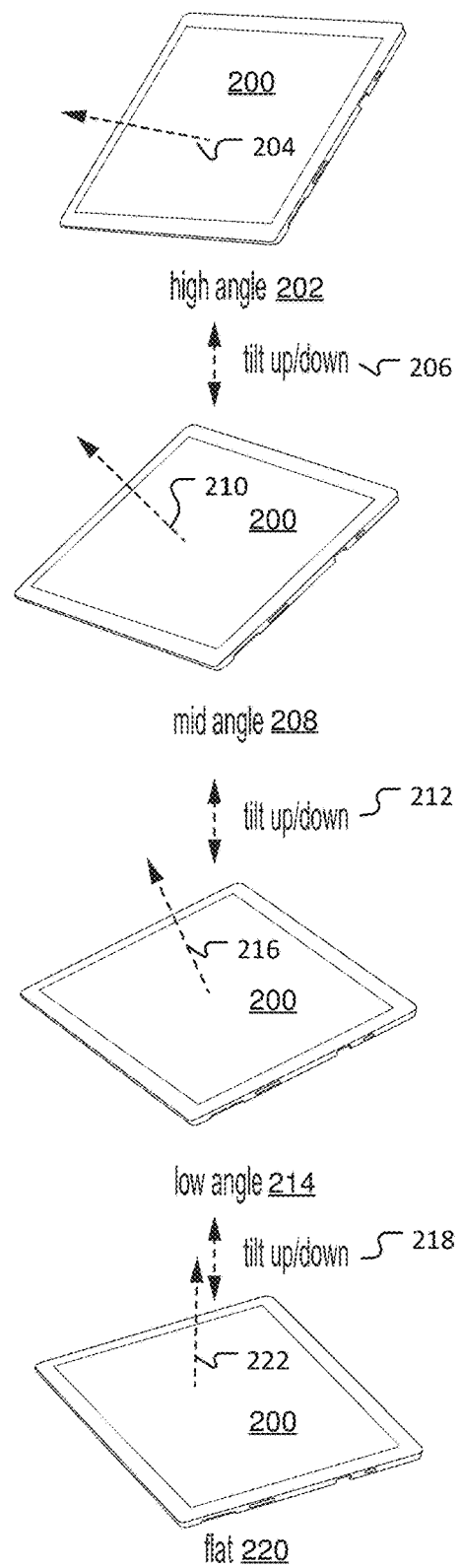
FIG. 2 depicts example tilt angles of a device about an axis in accordance with examples of the present disclosure.

FIG. 1 depicts details of an example device 100, such as a digital drawing board or computing device, in accordance with aspects of the present disclosure. Device 100 has a display screen 102 that is tiltable, an optional stand 104, and a computer system 106 (similar to that discussed in connection with FIG. 10), which may or may not be integrated with the display screen 102. As used herein, the term "digital drawing board" means a computing device that contains one or more adjustable display screen(s) 102 that allows the display screen 102 to tilt or rotate in at least one or multiple stable degrees of freedom. The display screen 102 of the device 100 may tilt or rotate about an x-axis, a y-axis, or a z-axis as shown in FIG. 1. The display screen contains an x-axis 108, a y-axis 110, and a z-axis 112. In some aspects, the display screen 102 is adjustable about a degree of freedom, such as the x-axis 108 as shown by arrow 114. This allows the device 100 to be "tilted" from and to virtually any angle, including, for example, from a high angle (e.g., nearly vertical position) to mid angle to a low angle (e.g., nearly horizontal) to a flat angle as shown in FIG. 2. Alternatively, or additionally, the device 100 is adjustable about the y-axis 110 as shown by arrow 116. This allows the display screen 102 to rotate from side-to-side or right-to-left. Additionally or alternatively, the display screen 102 is adjustable about the z-axis 112 as shown by arrow 118, which allows it to rotate from portrait to landscape mode and back. An inertial motion sensor 120 automatically senses the adjustment, whether it is a tilt about the x-axis 108, or rotation about the y-axis 110 or z-axis 112. On devices with more than one possible degree of freedom, the system can determine the intended degree-of-freedom of motion (e.g., the one with the largest angle) and then latch onto that as indicating the type of transformation to make. Any type inertial measurement unit will work as a sensor, including without limitation, an accelerometer, a gyroscope, an optical encoder, and/or a magnetometer. In aspects the device 100 has a stylus 122. In aspects, the device 100 also has at least a front facing camera 124.

FIG. 2 shows an example of a portable or mobile device 200, such as a tablet computer, in accordance with aspects of the present disclosure. The device 200 is adjustable about at least one degree of freedom by tilting about the x-axis (not shown). At a high angle position 202, the z-axis 204 is at 80 degrees or higher and the orientation of the device 200 is a generally upright or vertical. Although shown at 80 degrees, the high angle position 202 involves a range of generally vertical tilt positions and is not limited to 80 degrees. In aspects, the high angle position 202 may be more than or less than 80 degrees. At 206, the device 200 is tilted down to a mid angle position 208 such that the z-axis 210 is at 45 degrees. Although shown at 45 degrees, the mid angle position 208 involves a range of tilt positions and is not limited to 45 degrees. At 212, the device 200 is further tilted down to a low angle position 214 such that the z-axis 216 is at 20 degrees and the display orientation is considered to have a low angle. Although shown at 20 degrees, the low angle position 214 involves a range of tilt positions and is not limited to 20 degrees. At 218, the device 200 is further tilted down to a relatively flat angle position 220 such that the z-axis is at approximately 0 degrees. The relatively flat angle position 220 involves a range of tilt positions and is not limited to 0 degrees. Although only four positions of the device are shown, it is noted that the display screen may be placed at any angle including, but not limited to, from slightly more than 90 degrees (fully vertical) to approximately 0 degrees (fully flat) or, in the case of a mobile device, beyond (below zero, tilted away from the user). Still further, the device may be tilted in a backwards direction such that the angle of the z-axis is more than 90 degrees (not shown). Further, the sensors on the device 200 can sense when the device is at a relatively flat angle position 220 but being held by a user such that there are naturally slight changes in movement versus being in a non-moving position on a stable supporting surface, whereby it is in a stable position (e.g., not tilting/moving). Although the device is discussed as being tilted from a high angle position 202 down through various other angles until it is in a relatively flat angle position 220, the device 200 may be tilted up at any point as indicated by the double headed arrows 206, 212, and 218. Further, no order should be implied from this drawing as the tilt angles may be changed in any order at any time. In aspects, at least the specific degrees used for the high, mid, and low angles are user-adjustable settings as are the modes that are associated with these angles.

Figure 3A:
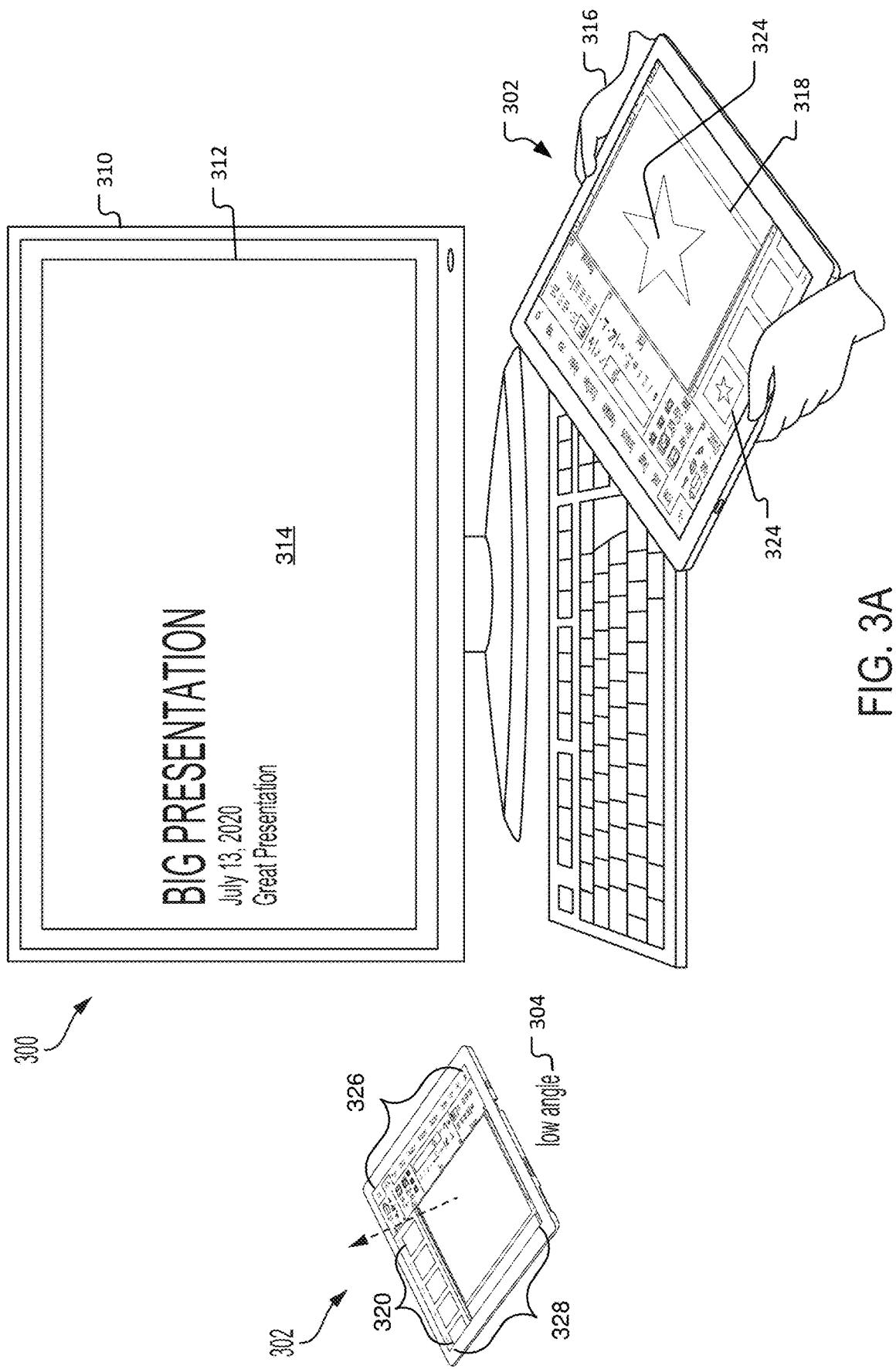

FIGS. 3A-3C illustrate systems and methods for tilt-to-share content from a secondary device 302 to a primary device 300 in accordance with aspects of the present disclosure. FIG. 3A shows the primary device 300 and the secondary device 302 before content has been shared (e.g., in the non-sharing mode), FIG. 3B shows content being sharing from the secondary device 302 to the primary device 300 at about a midpoint in the sharing operation, and FIG. 3C shows that the content from secondary device 302 has been fully shared (e.g., a shared mode) with primary device 300. In aspects, the secondary device 302 automatically transitions from a non-sharing mode in a flat angle (not shown) or low angle position 304 (FIG. 3A) to a full sharing mode when tilted to a high angle position 350 (FIG. 3C). Likewise, the secondary device 302 automatically transitions from full sharing mode to the stop or non-sharing mode when tilted back from the high angle position 350 to the low angle position 304 (or flat) position as described below. In other aspects, the transition might be semi-automatic in that the system asks for a user confirmation before initiating sharing. For example, the system might reveal a suggestion to share content and the user can accept this suggestion by tapping on the suggestion on the screen. In other aspects, the system might offer an option to choose whether automatic or semi-automatic transitions are the default. In still further aspects, the system might offer an option to turn off the tilt-to-share feature. Either way, the transition from one sharing mode to the other sharing mode is gradual and moves as long as the tilt continues and stops when the tilt stops.

The primary device 300 has a screen 310 and a window or stage 312 that is typically used for running and displaying a collaboration application, including, but not limited to, a videoconferencing application, a presentation application, a digital whiteboard, a word processing application, a spreadsheet application, a notes application, or any other application that allows multiple users to collaborate with each other in real-time. In aspects, multiple users may be participating in a session with the collaboration application, where some users are located in the vicinity of the primary device 300 and other users are remote from the primary device 300. In other aspects, the primary device need not be running a collaboration application and could be used by a single user to share from a secondary device to a primary device without collaborating with other users. In FIG. 3A, the collaboration application 314 running on device 300 is a presentation application such as Microsoft® PowerPoint®. There may be any number of users who are viewing the presentation through collaboration application 314 either in person (e.g., viewing the screen 310 of device 300) or remotely.

The secondary device 302 includes a sharing application 328 that includes a main display window 318 for displaying the content 322 that the user 316 has selected from a menu 320 (or carousel) of content items that are available to the user 316 on device 302. The content items may include any type of shareable content such as images, documents, videos, drawings, notes, and the like. The content items may be stored locally on device 302 or accessible via a remote network connection. In some aspects, what is shared may actually be an image or video stream of the content or a link to the content rather than the digital source files of the content itself. This corresponds to the social expectations and norms of showing someone a document, such as to focus a conversation about some aspect of its contents, but not actually giving the other person a copy of the document itself. The menu 320 may include any number of content items. The user 316 may change which content items are displayed in menu 320 by swiping up or down, by moving a scroll bar, by pressing arrow keys or buttons, or by any other method for transitioning what content items are displayed at a given time on the screen in menu 320. The sharing application 328 may also include any number of tools 326 that allow the user 316 to perform operations on the content items including without limitation, opening, closing, creating, copying, pasting, uploading, downloading, modifying, annotating, and/or altering the content items.

FIG. 3A illustrates a non-sharing mode, where the screen or stage 312 of the device 300 is displaying original content from the collaboration application 314 as opposed to content (such as content item 324) from a secondary device, such as device 302. The secondary device 302 is in a low angle position 304 (e.g. generally horizontal) or possibly a flat position (not shown). Although 20 degrees is shown, it is not required and other generally flat positions may satisfy the low angle position 304.

If user 316 wishes to share content with the users viewing the collaboration application 314, user 316 may initiate sharing by selecting a content item, such as item 324, from menu 320 of the sharing application 328 on the secondary device 302. This will cause content item 324 to be displayed in window 318 of the sharing application 328. The user 316 may then begin to tilt the secondary device 302 about the x-axis (not shown) to increase the angle of tilt from a low angle position 304 (FIG. 3A) to a mid angle position 330 (FIG. 3B). Beginning to tilt the secondary device 302 causes a sharing operation to begin. The sharing operation is gradual and continues to change as the tilt angle of the device 302 continues to change. As the tilt angle increases, the content item 324 from window 318 of device 302 begins to slide onto stage 312 of primary device 300 as shown by window 334, which includes a partial version of content item 324 at the midpoint shown in FIG. 3B. It the user 316 stops tilting the device 302 the sharing operation also stops. If user 316 chooses to abort the share operation at this point (for whatever reason), he or she may simply reverse the tilt direction to lower the tilt angle back to a low angle position 304 as shown in FIG. 3A. This will cause the window 334 and content item 324 to gradually slide out of/off of stage 312 of the primary device 300.

If, on the other hand, user 316 wishes to fully share or complete the sharing operation, he or she may continue to increase the tilt angle of secondary device 302 to a high angle position 350 as shown in FIG. 3C. As the tilt angle increases, the window 334 with shared content item 324 slides onto stage 312 until it takes up the whole of the stage 312 as shown in FIG. 3C. In other aspects, the full content item 324 may be displayed on the stage 312, but not take up the entire display area of the stage 312.

In aspects, the amount of the content item that shared (e.g. displayed) on the primary device is directly proportional to tilt angle of the secondary device. For example, in the non-sharing mode at the low angle position 304, no portion of the selected content item 324 is shown on primary device 300 as shown in FIG. 3A. On the opposite end, at the high angle position 350, 100% of the shared content item 324 is shared with (e.g. displayed on) the primary device 300 as shown in FIG. 3C. At the halfway point, or mid angle position 330, half of the content item 324 has moved onto (e.g. is displayed) on the primary device 300. The sharing of content is said to be gradual because the amount of content that is moved onto the primary device increases with every change in the tilt angle of the secondary device. The same if true for removing of content from the primary device. The amount of content that is displayed decreases with every change in the tilt angle as the tilt angle moves to the non-sharing mode.

In aspects, feedback (e.g., haptic or audible) may be provided when the full sharing mode is reached and/or when the stop sharing mode is reached.

In other aspects, once the full sharing mode is reached, a user of the secondary device may hover a finger or hand over the main display window 318 of the secondary device to automatically transmit shadows to the shared content on the primary device to highlight or point to aspects of the shared content item 324 as displayed in the window 334 on the stage 312 of the primary device 300.

Although the tilt-to-share shown in FIGS. 3A-3C are initiated by changing the tilt angle of the secondary device 302 from a generally horizontal position or low angle position 304 and increasing the tilt angle to a generally vertical or high angle position 350, the opposite could be true. That is, the non-sharing or stop sharing mode can be set at the high angle position 350 and the sharing operation could be initiated by lowering the tilt angle of the secondary device to a low angle position 304.

In yet other aspects, the stop sharing mode may be implemented by placing the secondary device 302 on a flat surface (as opposed to being held by a user). The sensors of the device 302 are capable of sensing that the device is in a flat stable position (e.g. on a table top) versus a flat position while being held by a user.

In further aspects, the user need not continue to hold the device 302 in a high angle position 350 to maintain the sharing mode. The sharing application tools 326 may have a way to lock the device in sharing mode through a gesture or a tool in the tools 326 of the sharing application 328. For example, a user might press and hold a fingertip within the window 318 of the sharing application 328 for a period of time to lock the device 302 in a sharing mode. The user would then be free to place the device 302 back on a table top or other surface without stopping the sharing of content to the primary device. Other gestures are also possible to lock the sharing application in sharing mode so the user does not have to hold the device 302 in a high angle position for an extended period of time. Likewise a gesture or tool may also be used to unlock the device 302 from sharing mode. For example, simply picking up the device 302 when it is in locked sharing mode could unlock the sharing mode, after which the sharing mode would revert back to determining the amount of sharing or not sharing based on the tilt angle of the secondary device 302. In other aspects, the system might reveal a suggestion to lock the device 302 is sharing mode, or if locked a suggestion to unlock sharing mode, and the user can accept this suggestion by tapping on the suggestion on the screen. In still other aspects, there may be a clutch control function or gesture, such as re-gripping the device 302, which would allow a user pause the transfer between sharing and not-sharing for annotation of shared content.

Figure 4A:
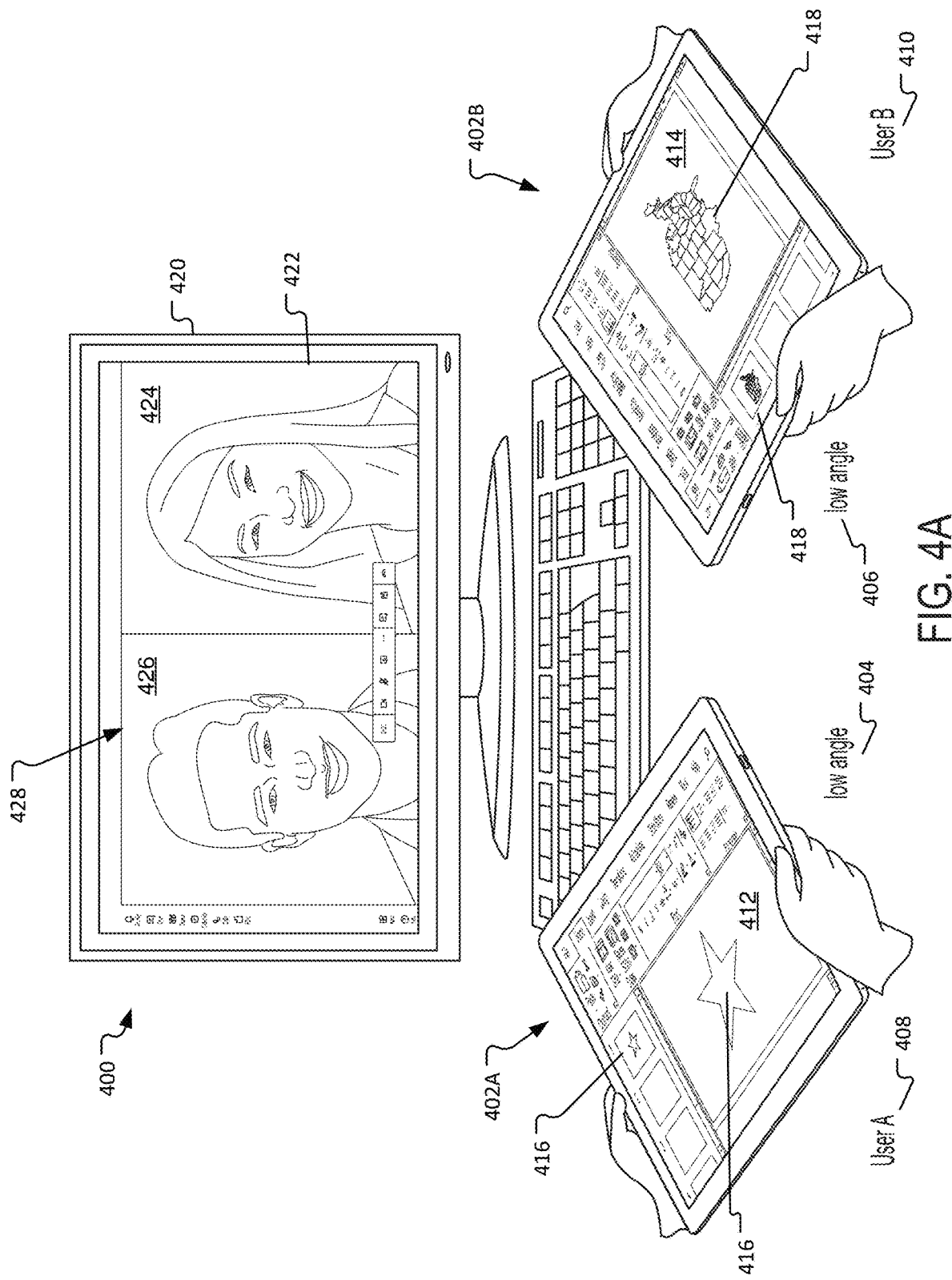
Figure 4B:
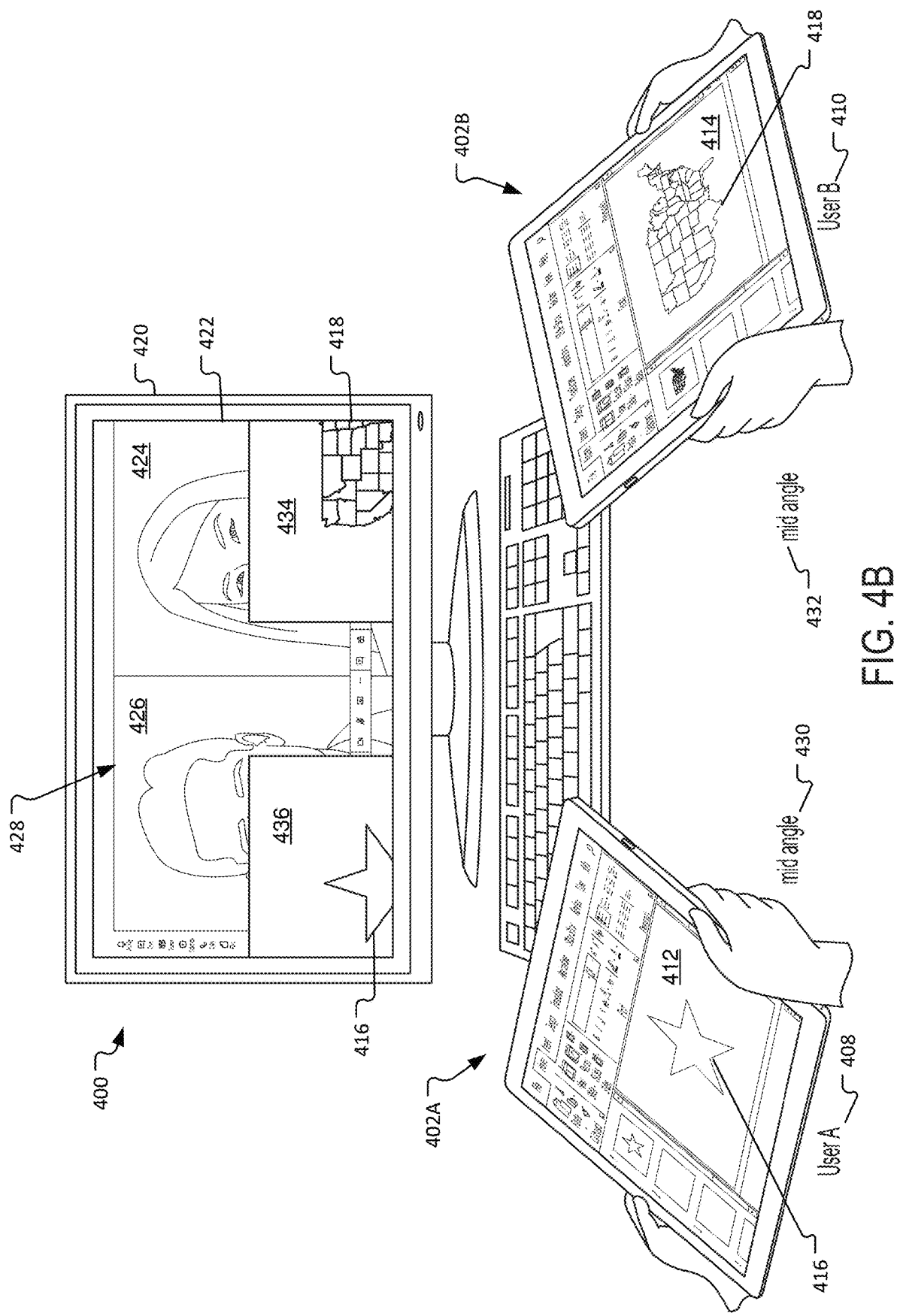
Figure 4D:
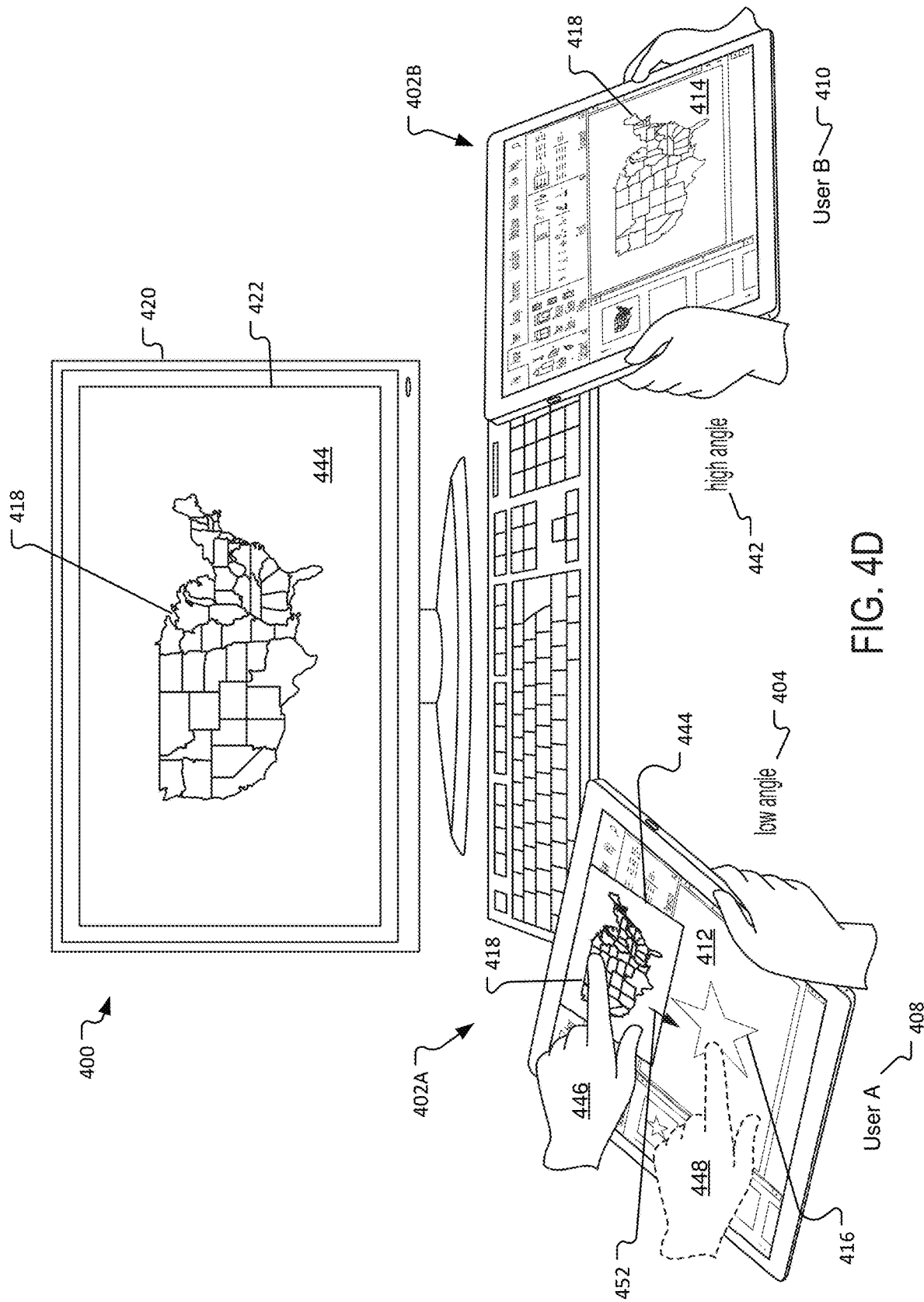

FIGS. 4A-4D illustrate tilt-to-share of content by from two secondary devices with a primary device 400 in accordance with aspects of the present disclosure. FIG. 4A shows the primary device 400 and the secondary devices 402A and 402B before content has been shared (e.g., in the non-sharing mode), FIG. 4B shows content being sharing from both the secondary devices 402A and 402B to the primary device 400 at about a midpoint in the sharing operation, FIG. 4C shows that the content from secondary device 402B has been fully shared (e.g., in shared mode) with primary device 400 whereas sharing has been stopped from secondary device 402A (e.g., in non-sharing mode), and FIG. 4D shows user A pulling the shared content from primary device 400 to user A's secondary device 402A. In aspects, the secondary devices 402A and 402B automatically transition from a non-sharing mode in a flat angle position (not shown) or low angle position 404 for device 402A and low angle position 406 for device 402B (FIG. 4A) to a full sharing mode for device 402B when tilted to a high angle position 442 (FIG. 3C) and a stop sharing mode when device 402A is tilted back to a low angle position or flat angle position 440. Likewise, the secondary devices 402A and/or 402B automatically transition from full sharing mode to the stop or non-sharing mode when tilted back from the high angle position 442 to the low angle position 404, 406 (or flat position) as described below. In other aspects, the transition might be semi-automatic in that the system asks for a user confirmation before initiating sharing. For example, the system might reveal a suggestion to share content and the user can accept this suggestion by tapping on the suggestion on the screen. In other aspects, the system might offer an option to choose whether automatic or semi-automatic transitions are the default. In still further aspects, the system might offer an option to turn off the tilt-to-share feature. Either way, the transition from one sharing mode to the other sharing mode is gradual and moves as long as the tilt continues and stops when the tilt stops.

In FIG. 4A, a collaboration application 428, such as a videoconferencing application or Microsoft® Teams™, is being displayed on a stage 422 of a screen 420 of a primary device 400. Such applications generally have different spaces or views, such as person space, a whiteboard space, a chat space, and screen sharing space, among others. In FIG. 4A, the person space is being shown with video feeds 424, 426 of two users participating in a videoconference.

User A 408 and user B 410 each have their own secondary devices 402A and 402B, respectively. Each of the secondary devices 402A and 402B have a sharing application, such as sharing application 328 shown in FIGS. 3A-3C. In aspects FIG. 4A shows both secondary devices 402A for user A 408 and 402B for user B 410 in a generally flat or low angle position 404, 406, respectively. In aspects, this tilt position corresponds to a non-sharing or stop-sharing mode. Indeed, although user A 408 has selected content item 416 from the sharing application menu as demonstrated by the display of content item 416 in window 412, and user B 410 has selected content item 418 as demonstrated by the display of content item 418 in window 414, neither content item 416 or content item 418 are yet shared to the stage 422 of the primary device 400.

FIG. 4B shows that both user A 408 and user B 410 have initiated the tilt-to-share process by tilting their devices 402A and 402B about the x-axis to increase the tilt angle from the low angle shown in FIG. 3A to a mid angle positions 430 and 432, respectively. The sharing applications on devices 402A and 402B automatically or semi-automatically begin to transition from a non-sharing mode to a sharing mode. The transition from non-sharing mode to sharing mode is gradual and fluid and moves as long as the tilt continues and stops when the tilt stops. At the midpoint, where device 402A is tilted to a mid angle position 430, the content item 416 begins to slide onto stage 422 from the left side as shown by window 436. As the sharing mode is not fully implemented, the content item 416 is only partially shown on the stage 422 of the primary device 400. Likewise, where device 402B is tilted to a mid angle position 432, the content item 418 begins to slide onto stage 422 from the right as shown by window 434. As the sharing mode is not fully implemented on device 402B, the content item 418 is only partially shown on the stage 422 of the primary device 400. Because two users initiated tilt-to-share at approximately the same time, the shared content 416 and 418 and associated windows 436 and 434, slide onto the stage 422 of the primary device 400 in a side-by-side arrangement with each entering the stage 422 from a different starting point. Other arrangements are possible depending on the number of users who tilt-to-share at or around the same time, or at a later time when other content is already "on stage".

As shown in FIG. 4C, tilting the secondary device 402B to a high angle position 442 causes the device 402B to transition into full sharing mode where the content item 418 from window 414 of device 402B is fully shared in window 444 on stage 422 of the primary device 400. The entire shared content item 418 is displayed on primary device 400 and has replaced the collaboration application 428 display of video feeds 424 and 426. In contrast, seeing that user B 410 also desired to share content to primary device 400, user A 408 has decided to stop sharing the content item 416 from secondary device 402A by reversing the direction of the tilt from the mid angle position 430 in FIG. 4B back to a flat angle position 440 shown in FIG. 4C. This reversing of the tilt direction caused the window 436 with content item 416 to gradually slide off of the stage 422 in proportion to (and at the speed) that the tilt angle of device 402A changes.

In another aspect, both user A 408 and user B 410 could both decide to share content at the same time by tilting their respective secondary devices 402A and 402B to a high angle position (not shown). In this case, the stage 422 of the primary device 400 would display both sharing windows 436 (with content item 416) and 434 (with content item 418) in place of the collaboration application 428 display of video feeds 424 and 426. These shared content items can be arranged on the stage 422 in any manner that allows the participants to view both items 416 and 418 of shared content. For example, they could be displayed side-by-side or one on top of the other. If one of the users decides to stop sharing by tilting his or her secondary device in the reverse direction, that user's content would slide off of the stage 422 and the other user's shared content would expand to fill the entire stage 422. Although two users are shown, any number of users may simultaneously share content using tilt-to-share so long as there is space on the stage 422 for participants in the collaboration application 428 to view the shared content.

Although FIG. 4B shows that both user A 408 and user B 410 initiated the tilt-to-share operation at around the same time, this is not necessary. One user, such as user B 410, could tilt-to-share content to the primary device first, which would result in User B 410's content taking up the entire stage 422 shown in FIG. 4C. Another user, such as user A 408, could thereafter decide that he too also wants to share content to primary device 400. User A 408 would tilt-to-share as described above, which would cause user B 410's shared content to shrink in size on stage 422 to make room to also display user A 408's shared content on stage 422.

FIG. 4D shows a receive operation or gesture that allows a user to effectively pull shared content from shared with the primary device to that user's secondary device. For example, user A 408 may initiate tilt-to-receive by tilting the secondary device 402A to a low angle position 404. Then the user A 408 may use a fingertip to swipe from the top of the secondary device at position 446 towards the bottom of the device at position 448 by following arrow 452 to effectively "pull" the shared content item 418 from the primary device 400 to user A 408's secondary device 402A. The shared window 444 with shared content item 418 is now displayed on the screen of secondary device 402A. In aspects, the shared content item 418 may be added to the sharing application including to the menu of content items (such as menu 320 shown in FIG. 3A) and/or the window 412. In aspects, the device 402A may be permitted to save and keep content item 418 or it may be permitted only to view, but not save, content item 418. The sharing device, such as device 402B, may have tools or settings that set permissions for the shared content item 418 with various options including prohibiting other users from pulling the shared content to their secondary device, allowing other users to pull shared content to their secondary device, but prohibit them from saving or modifying the shared content, or granting full access rights to other users to pull the content to their secondary devices, save it, modify it, etc. In other aspects, tilting the device 402A may not be necessary to pull content items from the primary device 400—only the pull gesture may be needed.

Figure 5A:
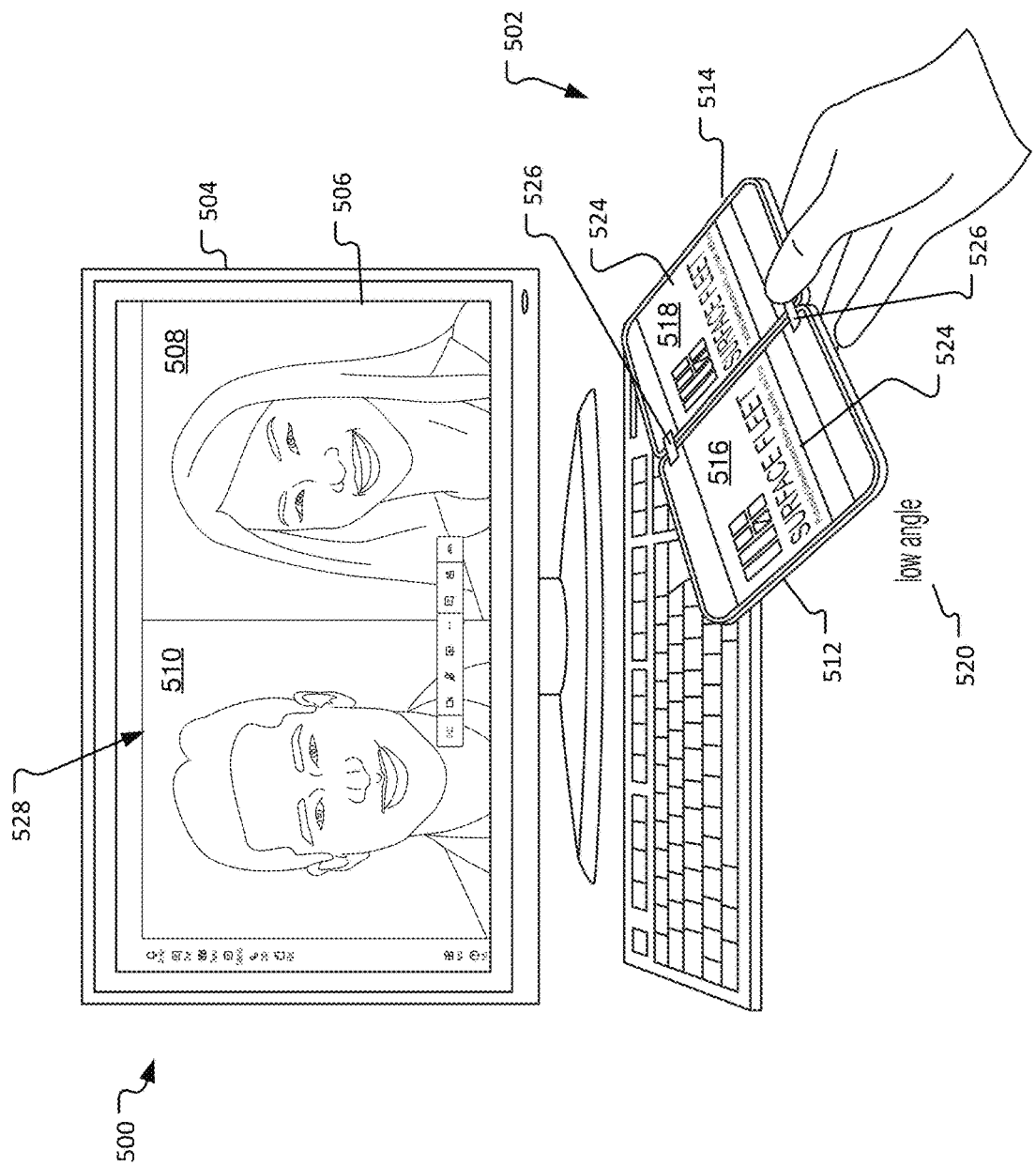
FIGS. 5A-5C illustrate sharing content from a secondary device to a primary device using various tilt angles in accordance with examples of the present disclosure.
Figure 5B:
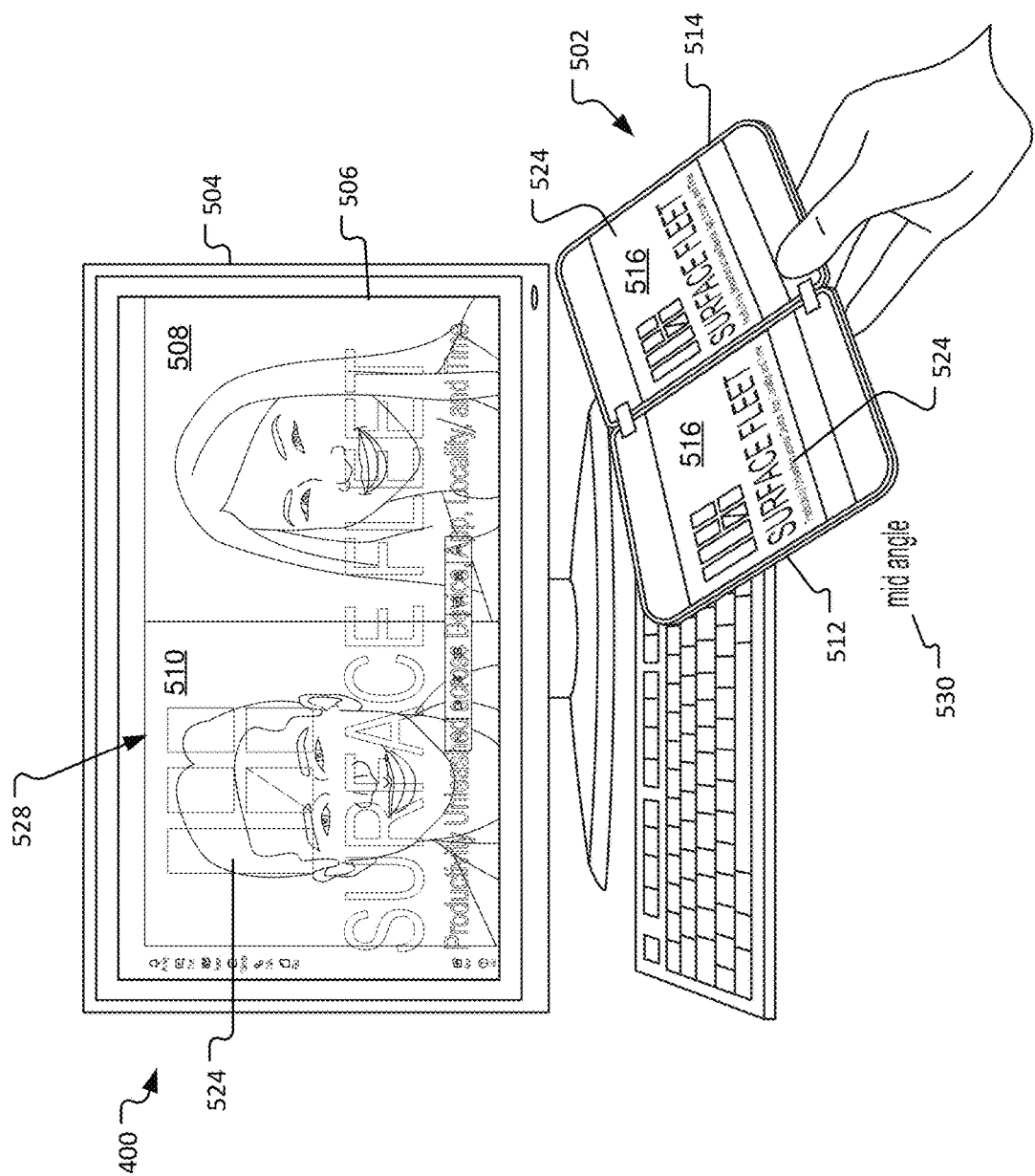
Figure 5C:
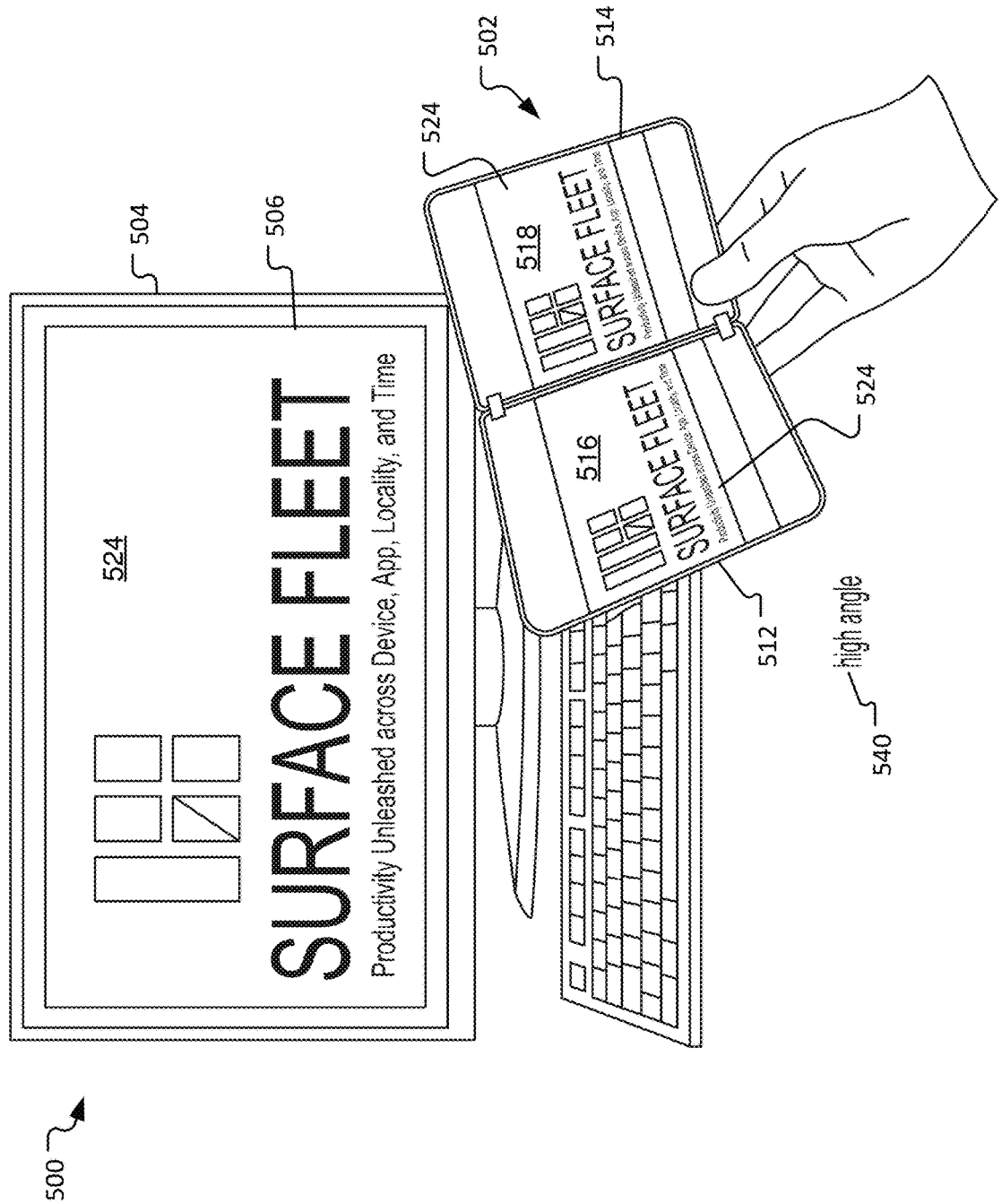

FIGS. 5A-5C illustrate other systems and methods for tilt-to-share content in accordance with aspects of the present disclosure. FIG. 5A shows the primary device 500 and a secondary device 502, such as a dual screen mobile phone like the Surface™ Duo™, before content has been shared (e.g., in the non-sharing mode), FIG. 5B shows content being shared from the secondary device 502 to the primary device 500 at about a midpoint in the sharing operation, and FIG. 5C shows that the content from secondary device 502 has been fully shared (e.g., in shared mode) with primary device 500. In aspects, the secondary device 502 automatically transitions from a non-sharing mode in a flat angle position (not shown) or low angle position 520 (FIG. 5A) to a full sharing mode for device 502 when tilted to a high angle position 540 (FIG. 5C). In other aspects, the transition might be semi-automatic in that the system asks for a user confirmation before initiating sharing. For example, the system might reveal a suggestion to share content and the user can accept this suggestion by tapping on the suggestion on the screen. In other aspects, the system might offer an option to choose whether automatic or semi-automatic transitions are the default. In still further aspects, the system might offer an option to turn off the tilt-to-share feature. Either way, the transition from one sharing mode to the other sharing mode is gradual and moves as long as the tilt continues and stops when the tilt stops.

In FIG. 5A, a collaboration application 528, such as a videoconferencing application or Microsoft® Teams™, is being displayed on a stage 506 of a screen 504 of a primary device 500. In FIG. 5A, the person space is being shown with video feeds 508, 510 of two users participating in a videoconference.

The secondary device 502 includes two screens 512 and 514 that pivot about a y-axis (not shown) via hinges 526 such that it has at least two degrees of freedom. The screens 512 and 514 each have a window 516 and 518, respectively, where each window 516 and 518 may display one or more content items 524. In aspects, the content items 524 displayed in windows 516 and 518 may be the same (as shown in FIG. 5A) or different. The secondary device 502 may include a sharing application, such as sharing application 328 in FIG. 3A, or may contain a different type of application that allows for display of content items. In FIG. 3A, the screens 512 and 514 are rotated about the y-axis so that they are parallel with each other such that they form a cohesive flat surface. The angle between the screens is approximately 180 degrees. The device 502 is tilted at a low angle position 520 such that it is in a non-sharing mode.

In FIG. 5B, the secondary device 502 has been tilted to a mid angle position 530, which has caused the tilt-to-share operation to begin. In aspects, rather than having the shared content item 524 in a window 516 or 518 gradually slide onto the stage 506 of the primary device 500, the shared content item 524 begins to fade-in to the whole stage 506 so that it is transparent and superimposed on top of the collaboration application 528. This allows a viewer to see both the video feeds 508 and 510 of the collaboration application 528 and the shared content item 524. The user may either stop tilting the device 502 at this point to maintain a view of both the collaboration application 528 and the shared content item 524 or continue to tilt the secondary device 502 to a full sharing mode as shown in FIG. 5C. In aspects, the amount of transparency of the shared content is a function of an angle of the secondary device with the angle being taken from a look-up table at predetermined degree increments (e.g., 5 degrees) and linear interpolation for angles in-between. In further aspects, bimodal distributions may be used where the content is fully transparent at a mid angle position and then fades-in if the secondary device tilts towards a low angle position and also fades-in if the device tilts towards the high angle position.

In FIG. 5C, the secondary device 502 has been tilted to a high angle position 540 to complete the transition to the sharing mode. The video feeds 508 and 510 of the collaboration application 528 have faded away and the shared content item 524 has faded in such that it take up the entire stage 506 of the primary device 500. The tilt-to-share operation may be reversed by tilting the secondary device 502 back to the mid angle position 530 or to stop sharing by tilting the device 502 to a low angle position 520.

Figure 6B:
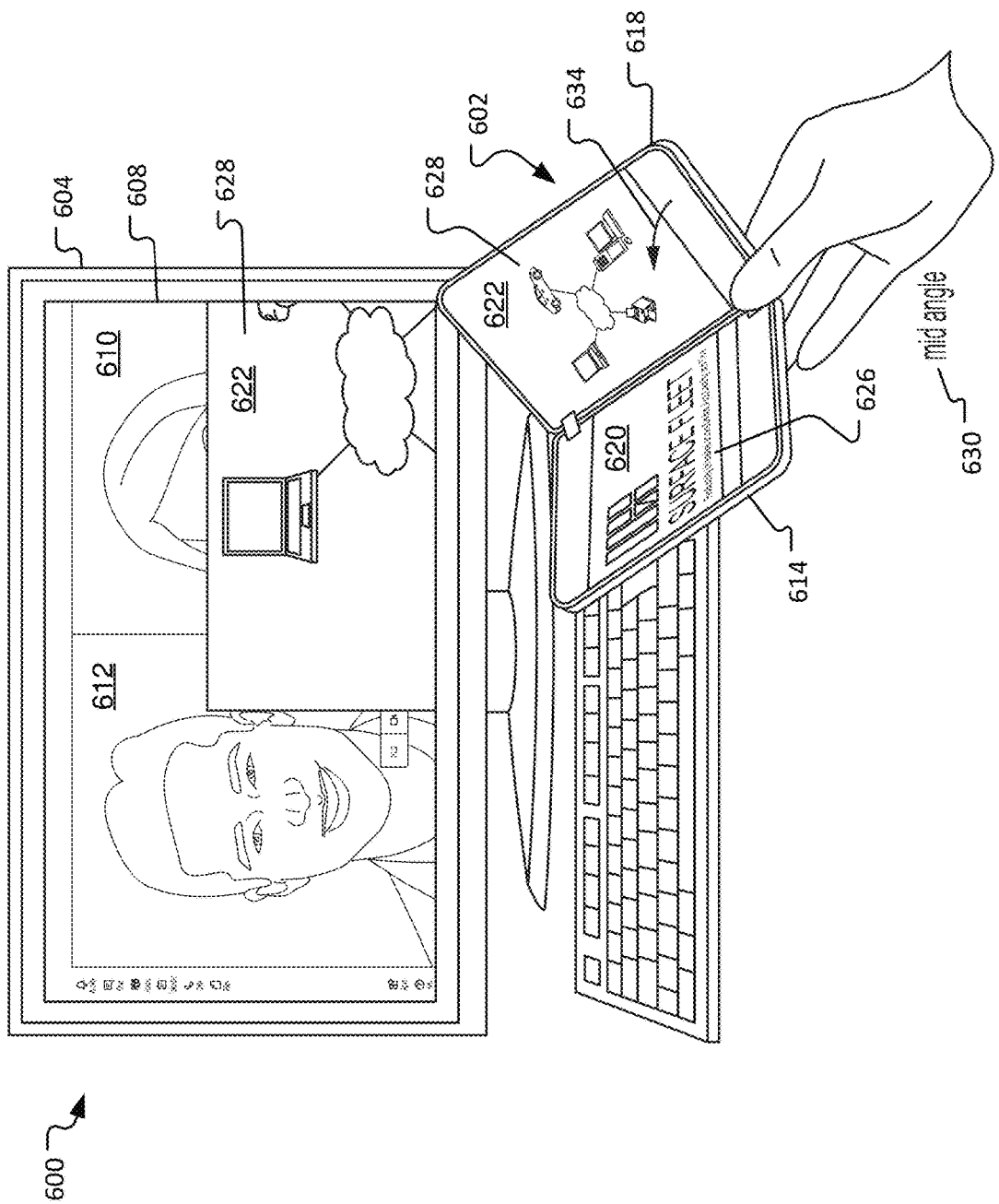
Figure 6C:
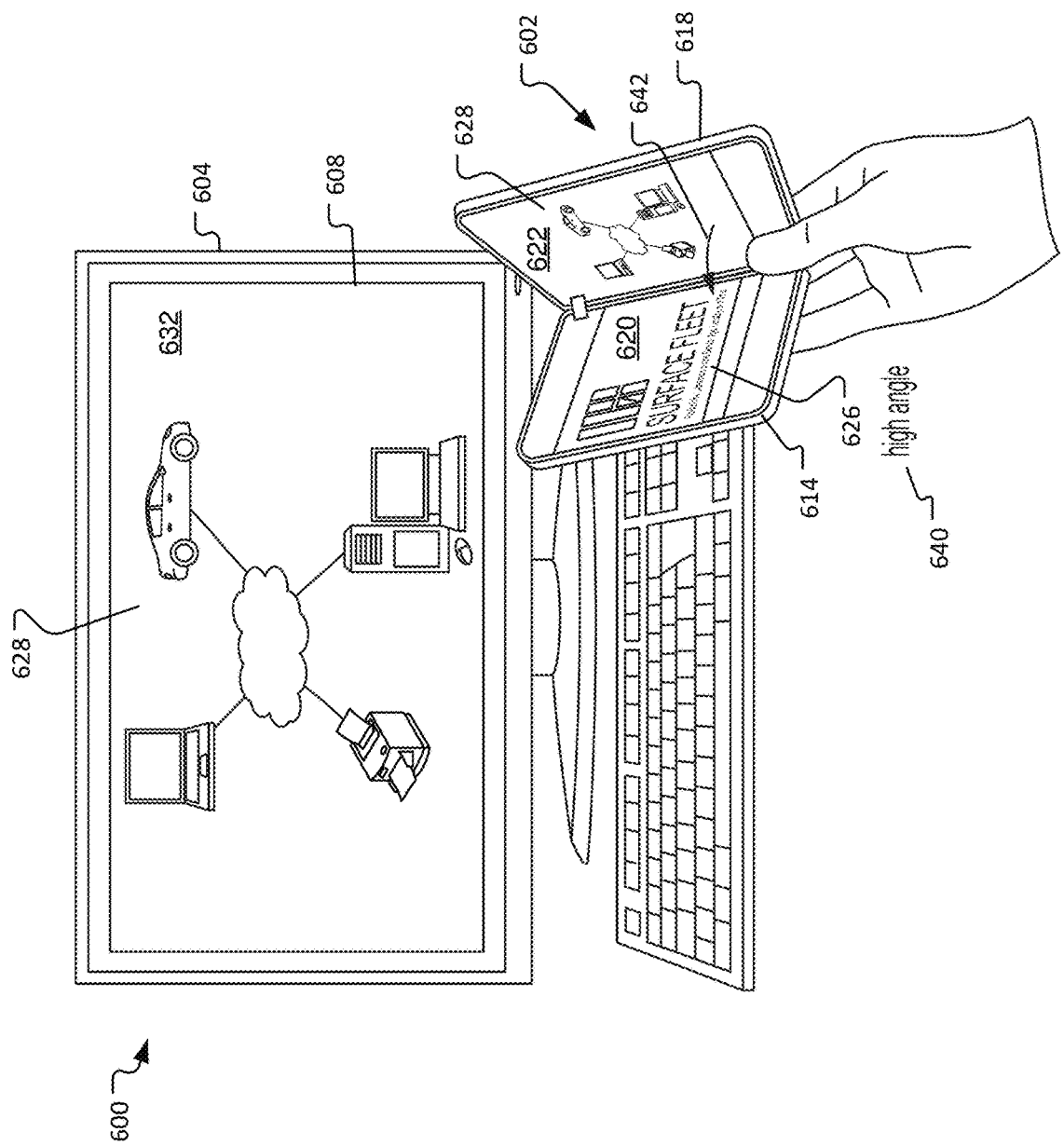
Figure 6D:
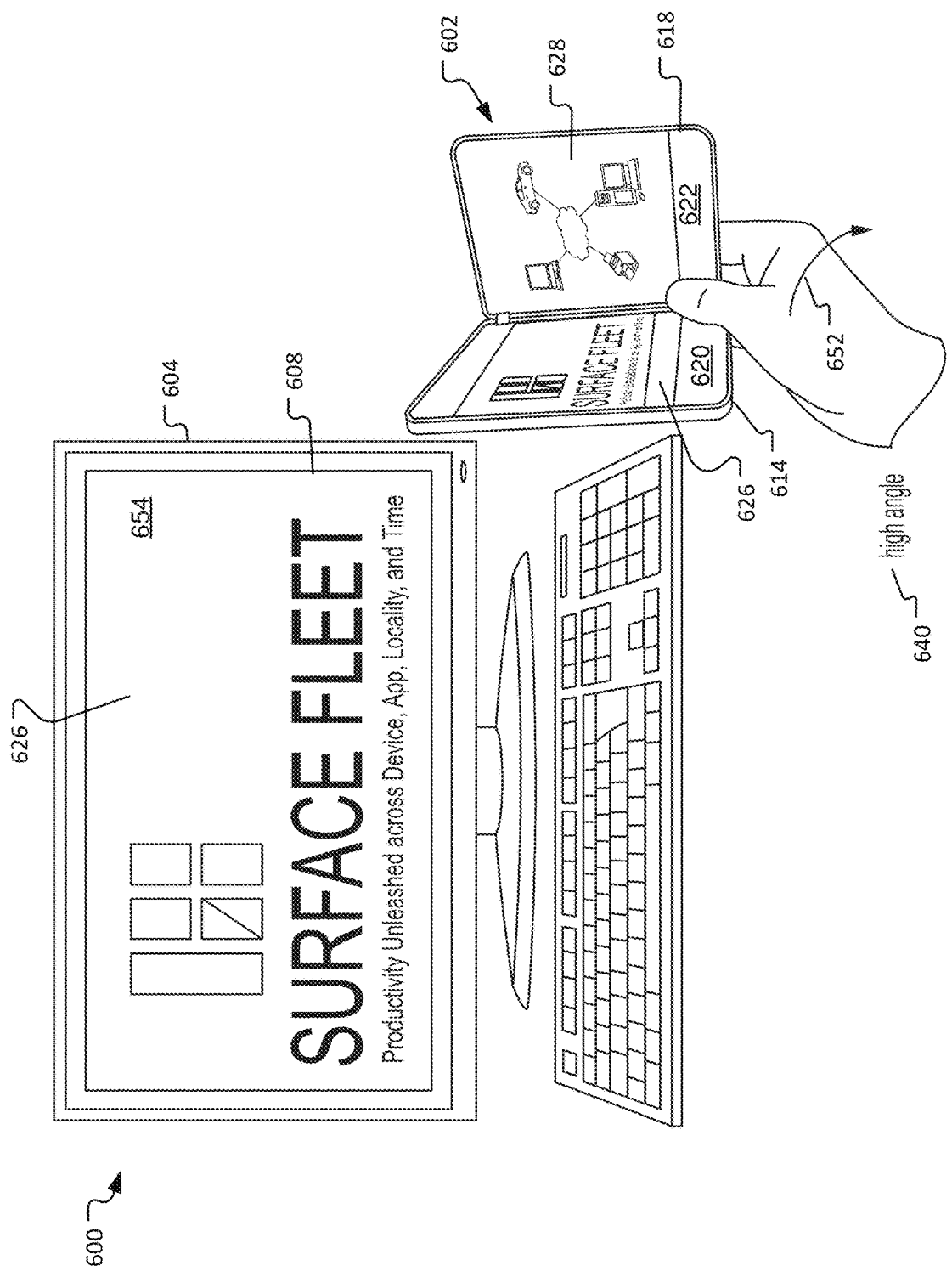

FIGS. 6A-6D illustrate other systems and methods for tilt-to-share content in accordance with aspects of the present disclosure. FIG. 6A shows the primary device 600 and a secondary device 602, such as a dual screen mobile phone like the Surface™ Duo™, before content has been shared (e.g., in the non-sharing mode), FIG. 6B shows content being shared from the right screen of the secondary device 602 to the primary device 600 at about a midpoint in the sharing operation, FIG. 5C shows that the content from the right screen of secondary device 602 has been fully shared (e.g., in shared mode) with primary device 600, and FIG. 6D shows that by tilting the secondary device 602 about a second degree of freedom content from the left screen may be shared with the primary device 600. In aspects, the secondary device 602 automatically transitions from a non-sharing mode in a flat angle position (not shown) or low angle position 624 (FIG. 6A) to a full sharing mode for device 602 when tilted to a high angle position 640 (FIG. 5C) or 650 (FIG. 5D). In other aspects, the transition might be semi-automatic in that the system asks for a user confirmation before initiating sharing. For example, the system might reveal a suggestion to share content and the user can accept this suggestion by tapping on the suggestion on the screen. In other aspects, the system might offer an option to choose whether automatic or semi-automatic transitions are the default. In still further aspects, the system might offer an option to turn off the tilt-to-share feature. Either way, the transition from one sharing mode to the other sharing mode is gradual and moves as long as the tilt continues and stops when the tilt stops.

In FIG. 6A, a collaboration application 631, such as a collaborative real-time videoconferencing application, is being displayed on a stage 608 of a screen 604 of a primary device 600. In FIG. 6A, the person space is being shown with video feeds 610, 612 of two users participating in a videoconference.

The secondary device 602 includes two screens 614 and 618 that pivot about a y-axis (not shown) via hinges 627 such that it has at least two degrees of freedom (about the x-axis and the y-axis). The screens 614 and 618 each have a window 620 and 622, respectively, where each window 620 and 622 may display one or more content items 626 and 628, respectively. In aspects, the content items 626 and 628 displayed in windows 620 and 622 may be the same or different (as shown in FIG. 6A). The secondary device 602 may include a sharing application, such as sharing application 328 in FIG. 3A, or may contain a different type of application that allows for display of content items. In FIG. 6A, the screens 614 and 618 are rotated about the y-axis so that they are parallel with each other such that they form a cohesive flat surface. The device 602 is tilted at a low angle position 624 such that it is in a non-sharing mode.

In FIG. 6B, the secondary device 602 has been tilted to a mid angle position 630, which has caused the tilt-to-share operation to begin. Further, the screens 614 and 618 have been rotated or pivoted about the hinges 627 (shown in FIG. 6A) toward each other as shown by arrow 634 so that the screens 614 and 618 are no longer are parallel to each other and the angle between the screens is less than 180 degrees. By rotating the screens 614 and 618 along a second degree of freedom (e.g., the y-axis) the user may select which content item 626 or 628 from which screen 614 or 618 to share with the primary device 600 via tilt-to-share. Here, through the tilt along the x-axis and the rotation about the y-axis, the user has indicated that he wishes to share the content item 628 in window 622 from screen 618. Because the device 602 is midway through the tilt transition (e.g. mid angle position 630), the window 622 and content item 628 have begun to slide/transition onto the stage 608 of the primary device 600, but sharing is not complete.

In FIG. 6C, the secondary device 602 has been tilted to a high angle position 640 to complete the transition to the sharing mode. The video feeds 610 and 612 of the collaboration application 631 have been replace with the shared content item 628 such that it takes up the entire stage 608 of the primary device 600. The tilt-to-share operation may be reversed by tilting the secondary device 602 back to the mid angle position 630 or to stop sharing by tilting the device 602 to a low angle position 624 or by laying the device 602 down on a flat surface (not shown).

Like FIG. 6C, in FIG. 6D the secondary device 602 has been tilted to a high angle position 640 to complete or maintain the device 602 in the sharing mode. However, the device 602 has been rotated about the y-axis (e.g. a second degree of freedom) as shown by arrow 652. This causes the content item that is shared to switch from content item 628 on screen 618 to sharing content item 626 on screen 614. The tilt-to-share operation may be reversed by tilting the secondary device 602 back to the mid angle position 630 or to stop sharing by tilting the device 602 to a low angle position 624 or by laying the device 602 down on a flat surface (not shown). Likewise, the shared content item may be switched from content item 626 to content item 628 by rotating the device 602 in an opposite direction of arrow 652 (as shown in FIG. 6C).

Figure 7:
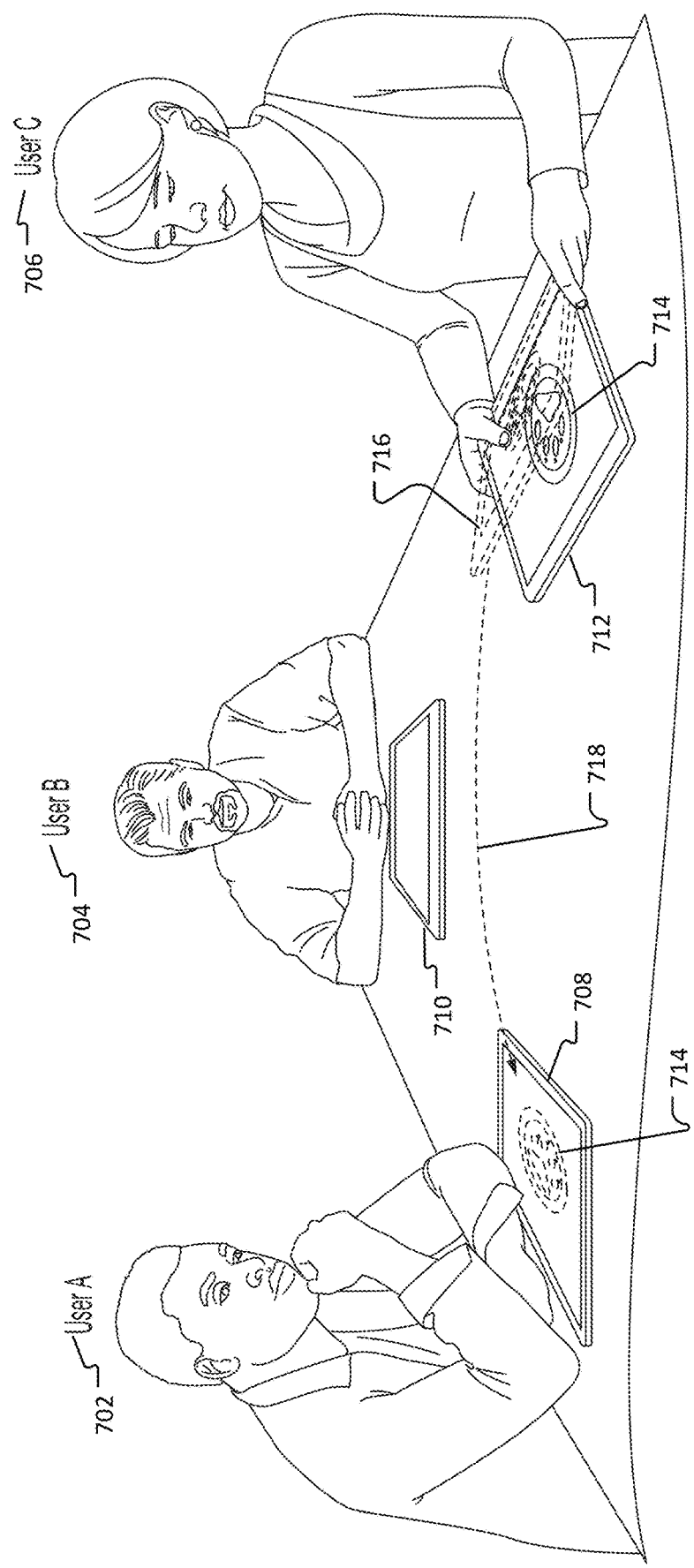
FIG. 7 illustrate sharing content from one user's device to another user's device using various tilt angles in accordance with examples of the present disclosure.

FIG. 7 depicts methods and systems for tilt-to-share from one device to another device in accordance with aspects of the present invention. In aspects, content may be shared among devices by tilting a device with content to be shared towards another device that will receive the shared content. User A 702, user B 704, and user C 706 are located in a shared space, such as conference room. User A 702 has a device 708, user B 704 has a device 710, and user C 706 has a device 712. The devices 708, 710, and 712 may include a sharing application, such as sharing application 328 shown in FIG. 3A. Alternatively, the devices 708, 710, and 712 may include another application that allows for selection and display of content items. User C 706 has a content item 714 displayed on her device 712 that she wishes to share with user A 702. She may initiate sharing of content item 714 by pointing her device 712 towards user A 702's device 708 and tilting her device 712 from a flat position (shown by the solid lines) to a tilted position 716 shown by the dashed lines. Tilting the device 712 in this manner will cause sharing of content item 714 with user A 702's device 708 as shown by dashed arrow 718 and the dashed content item 714 on device 708. The sharing device, such as device 712, may have tools or settings that set permissions for the shared content item 714 with various options including prohibiting the saving or modifying the shared content, or granting full access rights to other users to shared content including the ability to save it, modify it, etc.

Figure 8A:
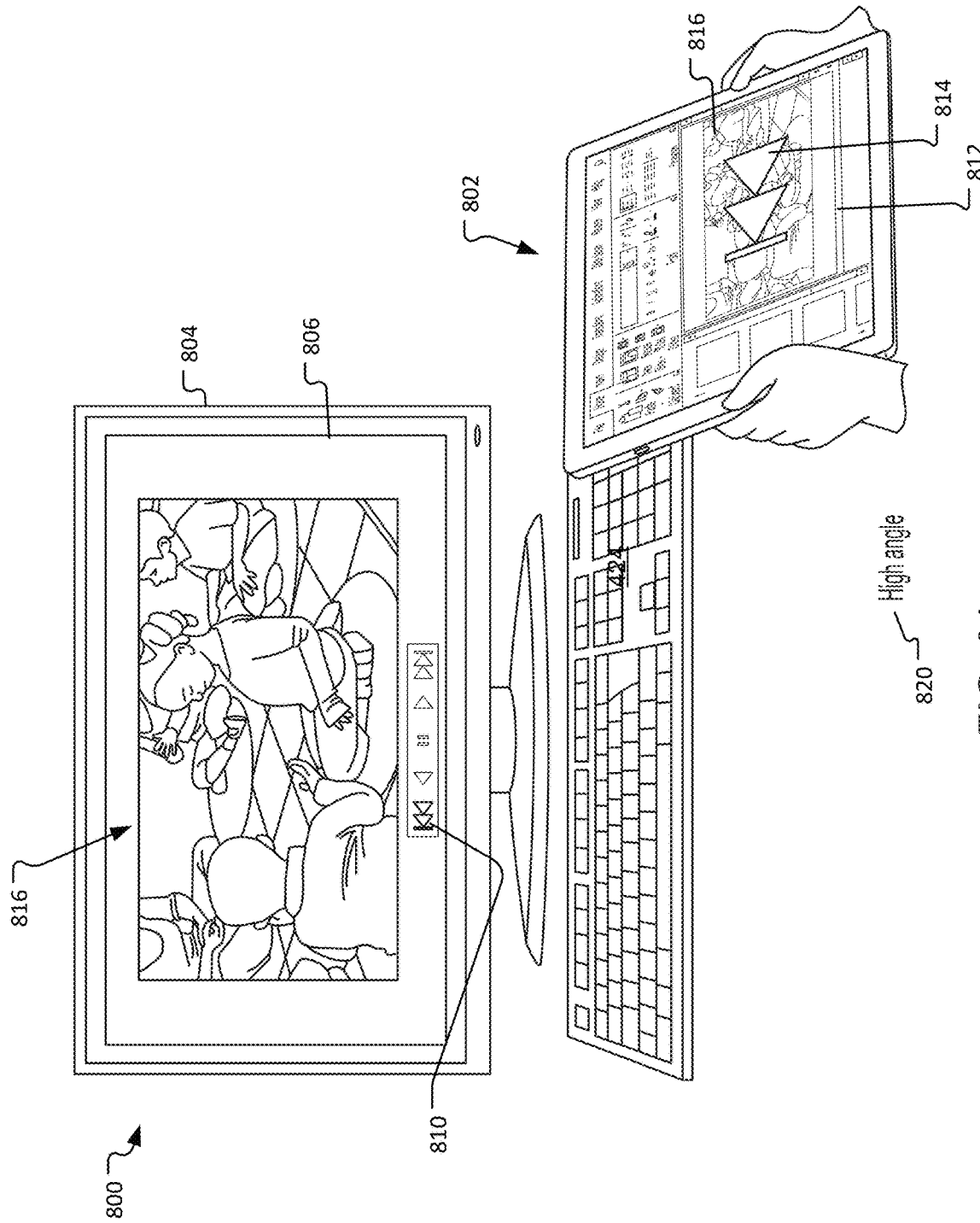
Figure 8B:
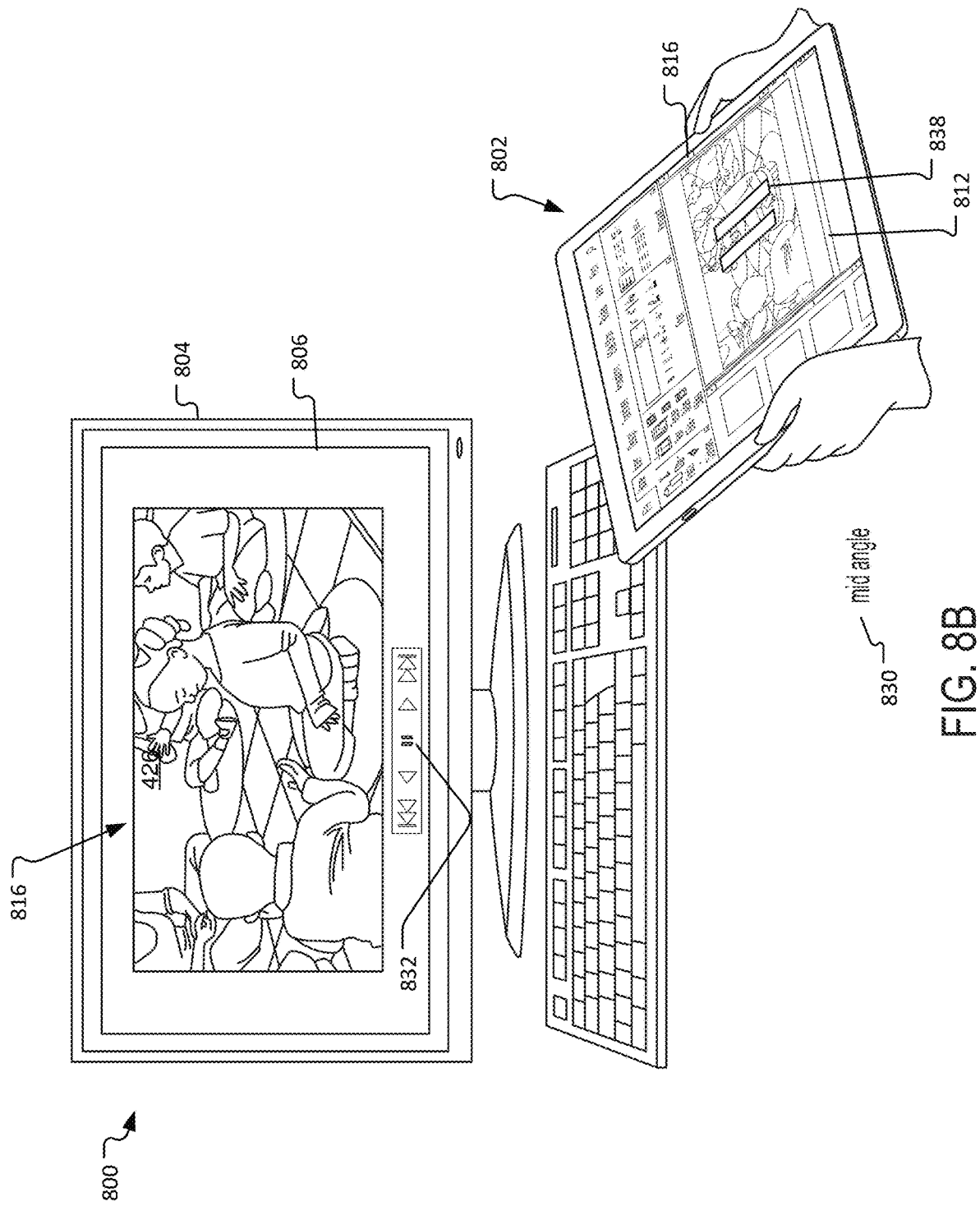

FIG. 8A-8C illustrate other systems and methods for tilt-to-control content displayed in accordance with aspects of the present disclosure. FIGS. 8A-8C show the primary device 800 and a secondary device 802 after content 816, such as a video, an animation, or a slide show, has been shared either via tilt-to-share or via some other means. The tilt angle of the secondary device 802 allows a user to control playback direction and speed of the content 816. In aspects, control modes are assigned to certain tilt angles. For example, a low angle position might be associated with a fast forward control mode, a mid angle position might be associated with a pause control mode, and a high angle position might be associated with a reverse/rewind control mode. In aspects, the reverse could implemented where the low angle position is associated with the reverse control mode and the high angle position is associated with the forward control mode. In aspects, a direction of playback (forward or reverse) and speed of playback is determined and implemented based on the sensed tilt angle and the direction of tilt movement of the secondary device. In aspects, the faster the tilt angle changes, the faster the speed of play is. In other aspects, the degree of tilt controls the speed of play. For example, the speed of forward play may reach its maximum speed as the tilt angle of the secondary device reaches a certain threshold for the low angle, such as 20 degrees.

In FIG. 8A, tilting the device 802 to a high angle position 820 causes the video content 816, which is displayed on the stage 806 of screen 804, to be played in reverse as shown by the bolded controls 810 on primary device 800 and the reverse arrows 814 that are superimposed on the video content 816 in the window 812 of the secondary device 802. In aspects, there may be a clutch control function or gesture, such as re-gripping the device 802, which would allow a user to pause a frame for annotation.

In FIG. 8B, tilting the device 802 to down to a lower tilt angle causes the speed of the reverse play to slow down until the video content 816 stop playing, or is paused, when the tilt of the device 802 reaches a mid angle position 830 as shown by the bolded controls 832 on the primary device 800 and the pause symbol 838 that is superimposed on the video content 816 in the window 812 of the secondary device 802.

In FIG. 8C, tilting the device 802 to down to a lower tilt angle causes the video content 816 to begin playing in forward direction when the tilt of the device 802 is lower than a mid angle position 830 and approaching a low angle position 850 as shown by the bolded controls 854 on the primary device 800 and the arrow symbols 858 that are superimposed on the video content 816 in the window 812 of the secondary device 802.

Figure 9A:
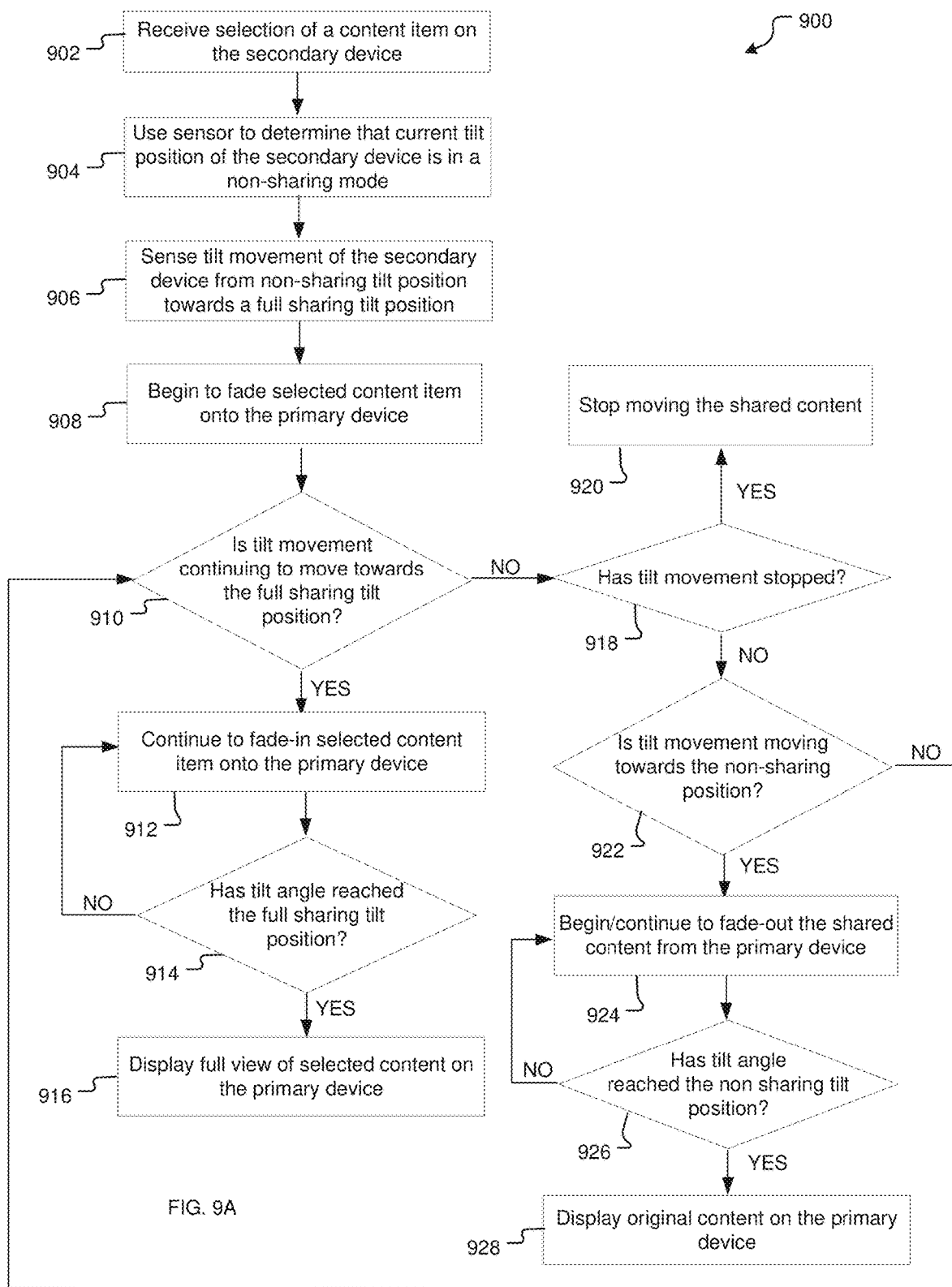
FIG. 9A depicts a method for automatically sharing content item(s) from a secondary device to a primary device based on a tilt position of the secondary device in accordance with aspects of the present disclosure.

FIG. 9A depicts details of a method 900 for automatically sharing content item(s) from a secondary device to a primary device based on a tilt position of the secondary device in accordance with aspects of the present disclosure. A general order for the steps of the method 900 is shown in FIG. 9A. Generally, the method 900 starts at 902 and ends at 928. The method 900 may include more or fewer steps or may arrange the order of the steps differently than those shown in FIG. 9A. The method 900 can be executed as a set of computer-executable instructions executed by a computer system and encoded or stored on a computer readable medium. Further, the method 900 can be performed by gates or circuits associated with a processor, Application Specific Integrated Circuit (ASIC), a field programmable gate array (FPGA), a system on chip (SOC), or other hardware device. Hereinafter, the method 900 shall be explained with reference to the systems, components, modules, software, data structures, user interfaces, etc. described in conjunction with FIGS. 1, 2, 3A-3C, 4A-4D, 5A-5C, 6A-6D, 7, 8A-8C, 9B-9C, 10, 11A, and 11B.

Method 900 begins at operation 902 where a secondary device, such as device 302, device 402A, device 402B, device 502, device 602, or device 802 receives a selection of a content item that a user wishes to share, through a sharing application, such as sharing application 328 in FIG. 3A, or some other application, on the secondary device. Next, at operation 904 the secondary device uses its one or more sensors, such as sensor 120 in device 100 in FIG. 1, to sense a current tilt position of the secondary device and determines, based on the sensed tilt position, that the device is in a non-sharing mode. As discussed with reference to the other figures, the current tilt position may be about any degree of freedom, such as between approximately 0 degrees and 95 degrees for the X rotation axis. In aspects, the current tilt position may be oriented about one degree of freedom, such as the x-axis, or oriented about more than one degree of freedom such as the x-axis, y-axis, and/or z-axis. In aspects, the tilt position associated with a non-sharing mode may be a flat position (either sitting on a flat surface or being held by a user) or a low angle position (e.g. generally horizontal). In aspects the low angle position may be from 0 to 20 degrees about the x-axis. In other aspects, tilt position associated with a non-sharing mode may be a high angle position (e.g. generally vertical). In aspects, the high angle position may be at 80 degrees to 95 degrees.

At operation 906, the sensors sense tilt movement of the secondary device towards a full sharing tilt position. In aspects, where the non-sharing position is a flat or low angle position about the x-axis, at operation 906 the sensors sense movement of the tilt angle towards a higher angle or an increase in the tilt angle.

At operation 908, in response to sensing tilt movement towards the full sharing mode, the system begins to fade-in the content onto a stage of a screen of a primary device, such as primary device 300, 400, 500, 600, or 800 described above with reference to FIGS. 5A-5C. In other aspects, the content may be shared by moving the selected content onto the stage of the screen of the primary device. As described above, there are many ways that the selected content to be shared may be moved to the primary device including, for example, by sliding a window with the selected content displayed therein staring from a origin point of the stage of the primary device. The origin point may be anywhere along an edge of the stage of the primary device. As the selected content slides on the stage of the primary device, it begins to cover the original content that was being displayed on the primary device, such as a PowerPoint presentation or a video feeds from a videoconference. Returning to the fade-in/fade-out aspect, the selected content may begin to fade on top of the original content, where in the original stages of sharing the selected content is highly transparent and becomes more solid as the tilt angle of the secondary device continues to tilt towards the full tilt mode. As long as the secondary device continues to tilt, the selected content continues to fade-in to (e.g., become less transparent) the primary device until the full sharing tilt position is reached that also corresponds with full display of the shared content on the primary device (in place of the original content displayed on the primary device). If the tilt movement stops, movement of the selected content onto the primary device also stops.

At decision 910, it is determined whether the secondary device is continuing to tilt towards the tilt position associated with the full sharing mode. If the answer is YES, the method 900 proceeds to operation 912 where the selected content item continues to fades-in to or moves onto the primary device at decision 914. If, on the other hand, the answer to decision 910 is NO, method 900 moves to decision 918 to determine whether the tilt movement has stopped. If the answer to 918 is YES, the method 900 moves to operation 920 where the selected content also stops fading/moving.

If at decision 918, the tilt movement has not stopped (e.g., the answer is NO), the method 900 moves to decision 922 to determine is the tilt movement is now going in the opposite direction (i.e., away from the full sharing mode). If the answer at decision 922 is YES, the method 900 proceeds to operation 924 where the selected content begins to fade-out, move off, or be removed from the primary device. Again as long as the secondary device is tilting towards the non-sharing tilt position, the content will continue to fade-out, move off of, or be removed from the primary device.

From operation 924, the method 900 moves to decision 926 to determine whether the tilt angle of the secondary device has reached the tilt angle associated with the non-sharing mode. If YES at decision 926, the selected content has been totally removed and the original content is displayed on the primary device. If NO at decision 926, the method 900 proceeds to 924 where the shared content is continued to be removed from the primary device.

Going back to decision 922, if the answer is NO then the method 900 proceeds to decision 910 to determine if the tilt position is moving toward the full sharing mode. If decision 910 is YES, the method 900 moves to operation 912 where the selected content continues to fade-in or move onto the primary device. At decision 914, it is determined whether the secondary device's tilt angle has reached the tilt angle associated with the full sharing position. If NO at decision 914, the method 900 proceeds to 912 where the selected content continues to fade-in or move onto the primary device. If YES at decision 914, the full view of the selected content is displayed on the primary device instead of the original content from the collaboration operation.

Figure 9B:
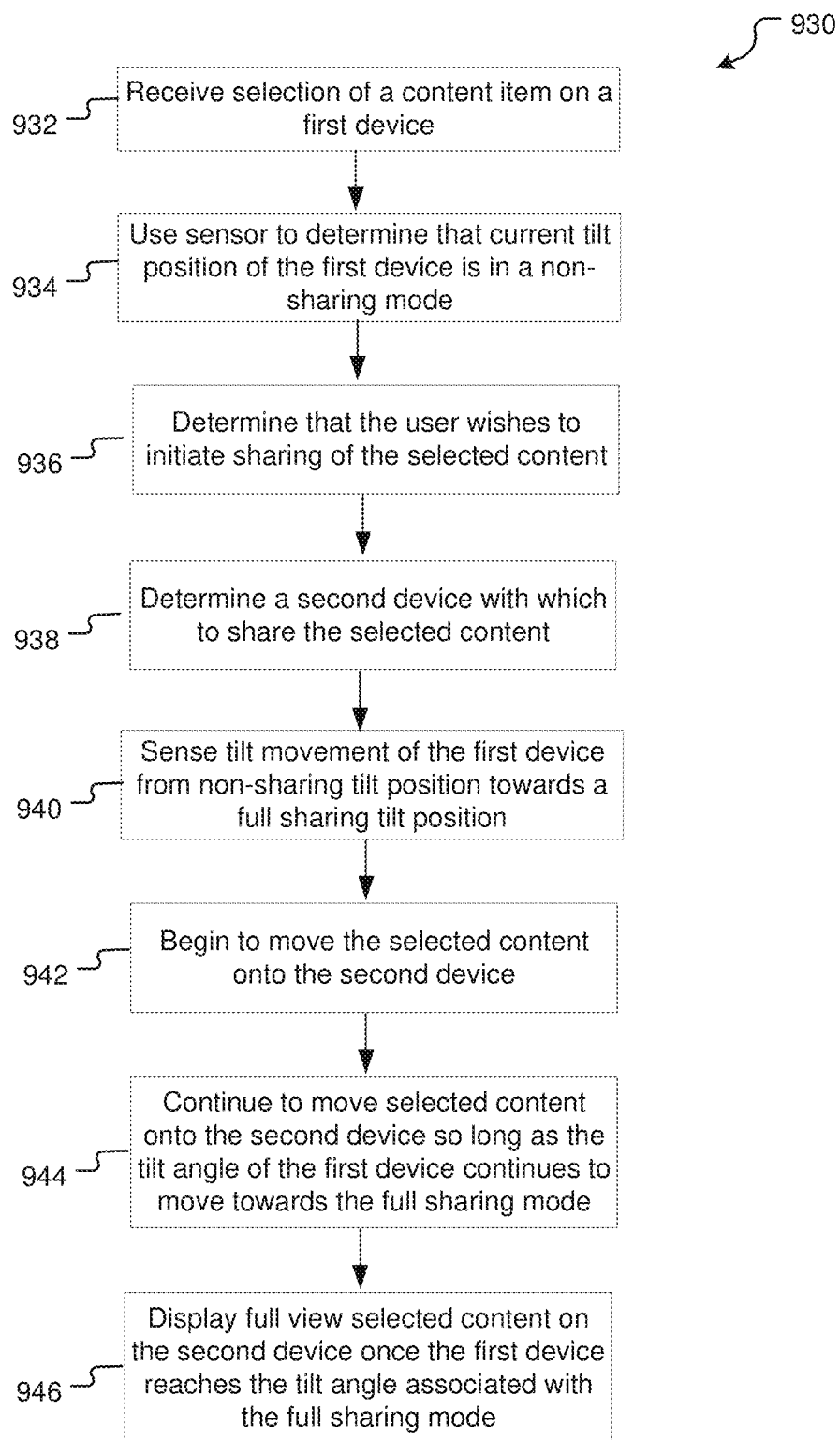
FIG. 9B depicts details of a method for automatically sharing content item(s) from a first device to second device based on a tilt position of the first device in accordance with aspects of the present disclosure.

FIG. 9B depicts details of a method 930 for automatically sharing content item(s) from a first device to second device based on a tilt position of the first device in accordance with aspects of the present disclosure. A general order for the steps of the method 930 is shown in FIG. 9B. Generally, the method 930 starts at 932 and ends at 946. The method 930 may include more or fewer steps or may arrange the order of the steps differently than those shown in FIG. 9B. The method 930 can be executed as a set of computer-executable instructions executed by a computer system and encoded or stored on a computer readable medium. Further, the method 930 can be performed by gates or circuits associated with a processor, Application Specific Integrated Circuit (ASIC), a field programmable gate array (FPGA), a system on chip (SOC), or other hardware device. Hereinafter, the method 930 shall be explained with reference to the systems, components, modules, software, data structures, user interfaces, etc. described in conjunction with FIGS. 1, 2, 3A-3C, 4A-4D, 5A-5C, 6A-6D, 7, 8A-8C, 9A, 9C, 10, 11A, and 11B.

Method 930 begins at operation 932 where a selection is received of a content item that a user wishes to share, through a sharing application, such as sharing application 328 in FIG. 3A, or some other application, on the first device. Next, at operation 934 the first device uses its one or more sensors, such as sensor 120 in device 100 in FIG. 1, to sense a current tilt position of the first device and determines based on the sensed tilt position that the device is in a non-sharing mode. As discussed with reference to the other figures, the current tilt position may be about any degree of freedom, such as between approximately 0 degrees and 95 degrees for the X rotation axis. In aspects, the current tilt position may be oriented about one degree of freedom, such as the x-axis, or oriented about more than one degree of freedom such as the x-axis, y-axis, and/or z-axis. In aspects, the tilt position associated with a non-sharing mode may be a flat position (either sitting on a flat surface or being held by a user) or a low angle position (e.g. generally horizontal). In aspects the low angle position may be from 0 to 20 degrees about the x-axis. In other aspects, tilt position associated with a non-sharing mode may be a high angle position (e.g. generally vertical). In aspects, the high angle position may be at 80 degrees to 95 degrees.

At operation 936, a determination is made that a user of the first device wishes to share the selected content with a second device. A user may indicate a desire to share the selected content in a number of ways. For example, the user of the first device may use a gesture to indicate a desire to share, such as for example, by pressing and holding a fingertip on the selected content item for a predetermined amount of time. In another aspect, the user may drag a fingertip across the display of the selected content starting closer to the user and moving away from the user—in a pushing type motion. In other aspects, there may be a share tool as part of the sharing application, the selection of which will turn on the tilt-to-share feature. In still other aspects, sharing may be automatically initiated by the user of the first device tilting it from a non-sharing mode to a sharing mode. In aspects, the sharing initiation might be semi-automatic in that the system asks for a user confirmation before initiating sharing. For example, the system might reveal a suggestion to share content and the user can accept this suggestion by tapping on the suggestion on the screen. In other aspects, the system might offer an option to choose whether automatic or semi-automatic transitions are the default. In still further aspects, the system might offer an option to turn off the tilt-to-share feature.

At operation 938, a determination is made as to an identity of a second device with which to share the selected content. In aspects, the first device automatically senses that it is pointing at a second device. In other aspects, the user may select a second device with which to share by selecting a specific user of that device (e.g., by touching the specific user's video feed, or name or other identifier) from a number of users participating in an online collaboration application. In still other aspects, the second device may be selected by verbally identifying the second device or its user. Once this second device is identified, sharing the selected content may be automatic upon sensing the tilt-to-share gesture. In another aspect, selecting this device for sharing the selected content may be automatic in that the system asks for a user confirmation before initiating sharing with this second device. In aspects, the first device may identify multiple devices it is pointing towards and prompt the user to select which of these multiple devices to share to. In other aspects, the first device may identify multiple devices within a certain proximity of the first device and prompt the user to select which of these devices for sharing. Although sharing to one device is shown in FIG. 7, sharing may be accomplished with multiple devices at the same time. Further, the device to be shared with need not be located in the same physical space as the sharing device.

At operation 940, the sensors on the first device detect tilt movement of the first device from a non-sharing tilt position towards a full sharing tilt position. At operation 942, once tilt movement is detected in operation 940, the selected content begins to move onto the screens of the devices identified in operation 938. At operation 944, the selected content continues to move the second device(s) commensurate with the continue movement of the tilt angle towards the full sharing mode. As long as the first device continue to tilt towards the tilt angle associated with the full sharing mode, the selected content will continue to move to the identified second device(s). If the tilt movement of the first device stops, the movement of the selected content on the second device(s) also stops. At operation 946, the tilt angle of the first device reaches the tilt angle associated with full sharing mode and the selected content is fully displayed on previously selected second device(s).

Although not shown in FIG. 9B, the first device can stop sharing the selected content with the second device(s) at any time by reversing the tilt direction of the first device. This will cause the selected content to start to move off of the second device(s) commensurate with the change in tilt angle of the first device until the first device reaches the tilt-angle associated with the non-sharing position. At this point the selected content will no longer be displayed on the second device(s).

Figure 9C:
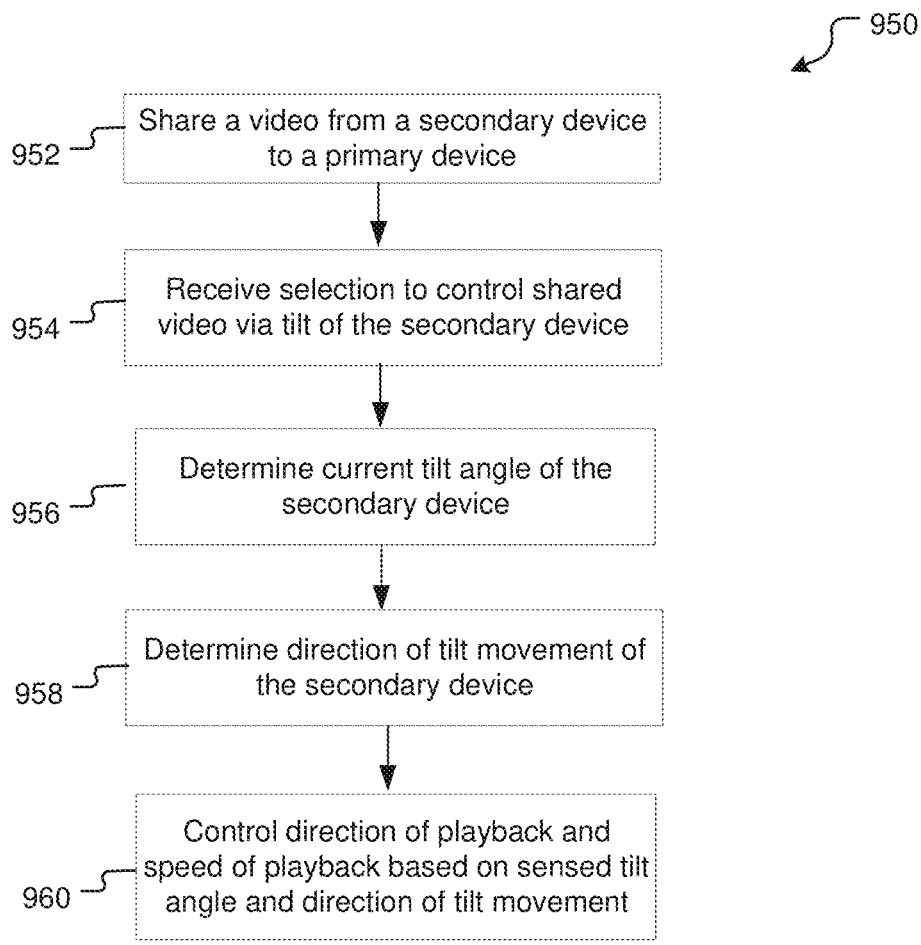
FIG. 9C depicts details of a method for automatically controlling with a first device a shared content item, such as video or slide show, that has been shared to second device based on a tilt position of the first device in accordance with aspects of the present disclosure.

FIG. 9C depicts details of a method 950 for automatically controlling with a first device a shared content item, such as video or slide show, that has been shared to second device based on a tilt position of the first device in accordance with aspects of the present disclosure. A general order for the steps of the method 950 is shown in FIG. 9C. Generally, the method 950 starts at 952 and ends at 960. The method 930 may include more or fewer steps or may arrange the order of the steps differently than those shown in FIG. 9B. The method 950 can be executed as a set of computer-executable instructions executed by a computer system and encoded or stored on a computer readable medium. Further, the method 950 can be performed by gates or circuits associated with a processor, Application Specific Integrated Circuit (ASIC), a field programmable gate array (FPGA), a system on chip (SOC), or other hardware device. Hereinafter, the method 950 shall be explained with reference to the systems, components, modules, software, data structures, user interfaces, etc. described in conjunction with FIGS. 1, 2, 3A-3C, 4A-4D, 5A-5C, 6A-6D, 7, 8A-8C, 9A, 9B, 10, 11A, and 11B.

Method 950 begins at operation 952 where content is shared from a secondary device to a primary device using any methods including the tilt-to-share systems and methods described herein. The shared content is manipulatable, such as a video, an animation, or a slide show.

At operation 954, the secondary device receives a selection to control the shared video (or animation or slide show) on the primary device. A user may indicate a desire to control the selected content in a number of ways. For example, the user of the first device may use a gesture to indicate a desire to control, such as for example, by pressing and holding a fingertip on the selected video for a predetermined amount of time. In other aspects, there may be a control tool as part of the sharing application, the selection of which will turn on the tilt-to-control feature. In still other aspects, controlling the video may be automatically initiated by the user by picking up the secondary device and/or by tilting it from a one mode to another mode. In aspects, the control initiation might be semi-automatic in that the system asks for a user confirmation before initiating control. For example, the system might reveal a suggestion to control content and the user can accept this suggestion by tapping on the suggestion on the screen. In other aspects, the system might offer an option to choose whether automatic or semi-automatic controls are the default. In still further aspects, the system might offer an option to turn off the tilt-to-control feature.

At operation 956, the sensors on the secondary device sense the tilt angle of the first device. In aspects, the may be the tilt angle of the first device is about one degree of freedom, such as the x-axis, but could be about more than one degree of freedom. In aspects, control modes are assigned to certain tilt angles. For example, a low angle position might be associated with a fast forward control, a mid angle position might be associated with a pause control, and a high angle position might be associated with a reverse/rewind control.

At operation 958, the sensors on the secondary device sense which direction the tilt angle is moving. For example, the secondary device may be moving from a high angle position to a low angle position or vice-versa.

At operation 960, a direction of playback (forward or reverse) and speed of playback is determined and implemented based on the sensed tilt angle and the direction of tilt movement of the secondary device. For example, if the tilt angle of the secondary device is sensed to be between the low angle position and the mid angle position and moving towards the mid angle position, the video playback may be switch to rewind playback at a speed that is slowing down as the secondary device nears the mid angle position. When it reaches the mid angle position, the video will be paused and remain paused as long as the secondary device stays relatively stationary at the mid angle position. If the tilt angle continues to move past the mid angle position towards the high angle position, the video will start playing in forward direction. The speed of play will increase as the tilt angle of the secondary device continues to tilt to the high angle position.

Figure 10:
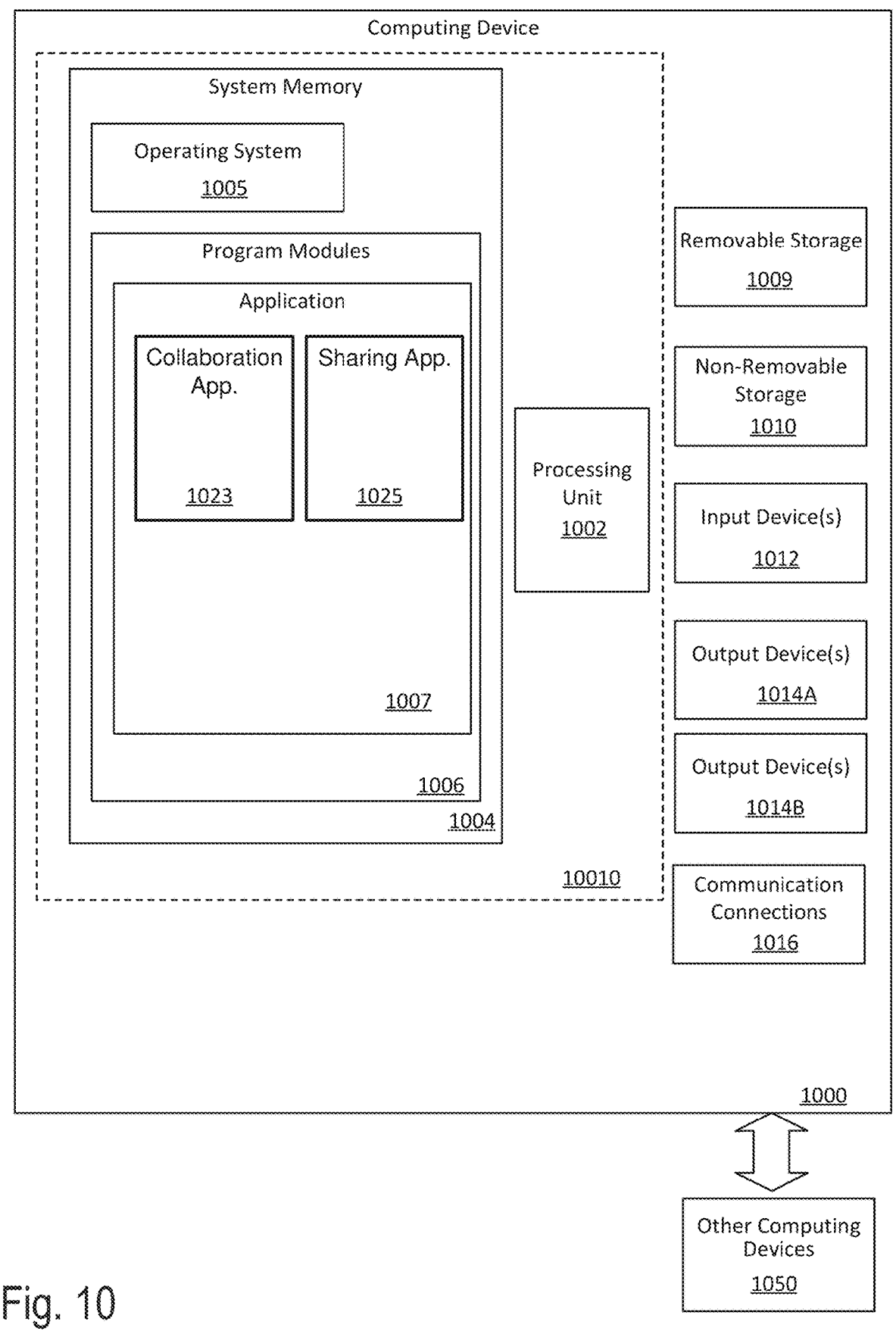
FIG. 10 depicts block diagram illustrating physical components (e.g., hardware) of a computing device with which aspects of the disclosure may be practiced.
Figure 11A:
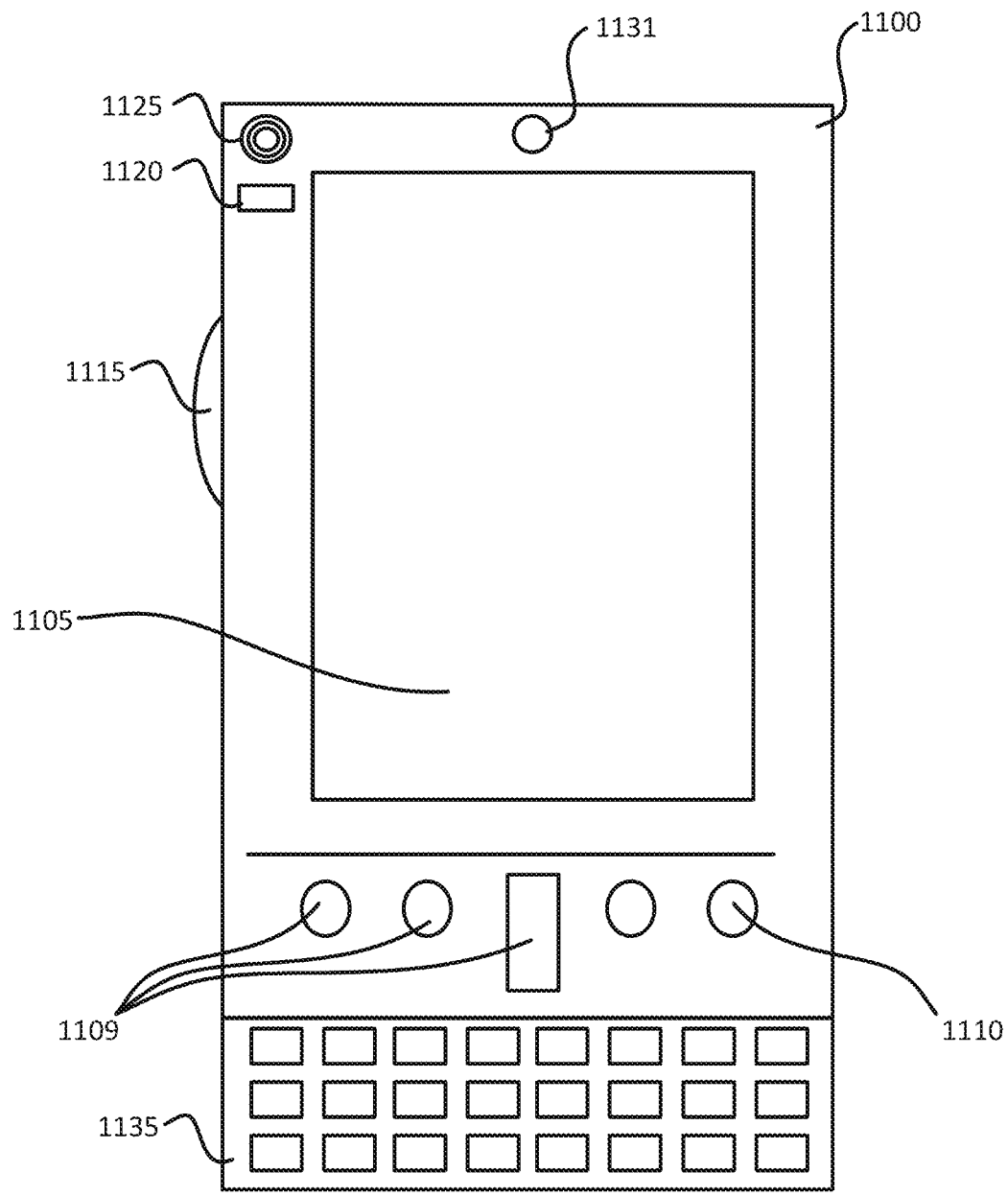
FIG. 11A illustrates a first example of a computing device with which aspects of the disclosure may be practiced.
Figure 11B:
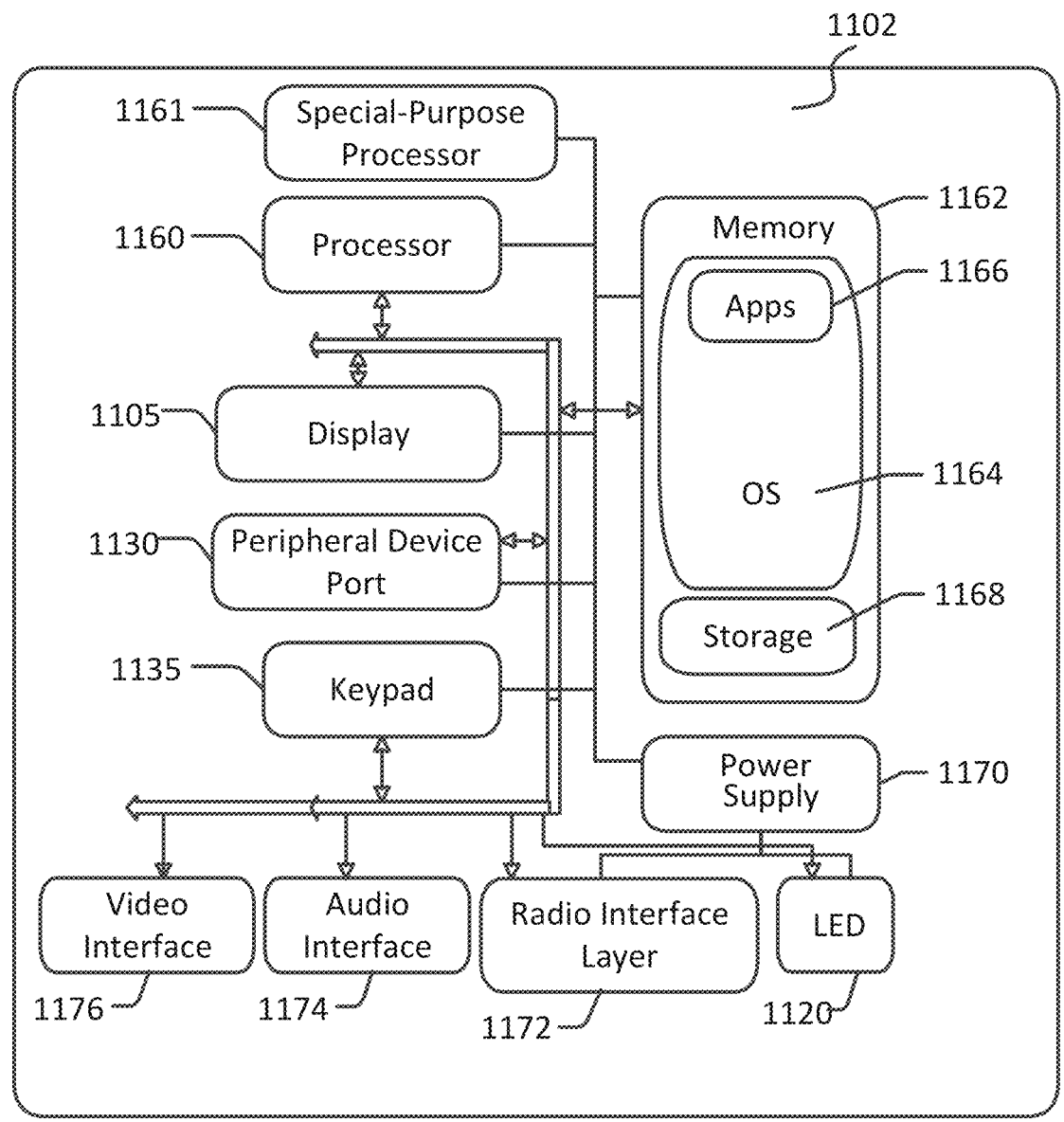
FIG. 11B illustrates a second example of a computing device with which aspects of the disclosure may be practiced.

FIGS. 10, 11A, and 11B and the associated descriptions provide a discussion of a variety of operating environments in which aspects of the disclosure may be practiced. However, the devices and systems illustrated and discussed with respect to FIGS. 10-11B are for purposes of example and illustration and are not limiting of a vast number of computing device configurations that may be utilized for practicing aspects of the disclosure, described herein.

FIG. 10 is a block diagram illustrating physical components (e.g., hardware) of a computing device 1000 with which aspects of the disclosure may be practiced. The computing device components described below may be suitable for any of the computing devices described above. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories.

The system memory 1004 may include an operating system 1005 and one or more program modules 1006 suitable for running software applications 1007, such as but not limited to a collaboration application 1023 and a sharing application 1025 and/or one or more components supported by the systems described herein.

Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the at least one processing unit 1002, the program modules 1006 may perform processes including, but not limited to, one or more aspects, as described herein. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014A such as a display, speakers, a printer, etc. may also be included. An output 1014B, corresponding to a virtual display may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 11A and 11B illustrate a mobile computing device 1100, for example, a mobile telephone, a smart phone, wearable computer (such as a smart watch), a tablet computer, a laptop computer, and the like, with which aspects of the disclosure may be practiced. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some aspects. In yet another alternative aspect, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various aspects, the output elements include the display 1105 for showing a graphical user interface (GUI), a visual indicator 1131 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external source.

FIG. 11B is a block diagram illustrating the architecture of one aspect of computing device, a server, or a mobile computing device. That is, the computing device 1100 can incorporate a system (e.g., an architecture) 1102 to implement some aspects. The system 1102 can implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 (such as a collaboration application and/or a sharing application) may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and/or one or more components supported by the systems described herein. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100 described herein (e.g. a collaboration application 1023, sharing application 1025).

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 972 may be disseminated to the application programs 1166 via the operating system 1164, and vice versa.

The visual indicator 1120 may be used to provide visual notifications, and/or an audio interface 1174 may be used for producing audible notifications via the audio transducer 1125. In the illustrated configuration, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with aspects of the present disclosure, the microphone may also serve as an audio sensor to facilitate control of notifications, as will be described below. The system 1102 may further include a video interface 1176 that enables an operation of an on-board camera to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

FIG. 12 illustrates one aspect of the architecture of a system for processing data received at a computing system from a remote source, such as a personal computer 1204, tablet computing device 1206, or mobile computing device 1208, as described above. Content displayed at server device 1202 may be stored in different communication channels or other storage types.

In accordance with examples of the present disclosure, a method for sharing a content item from a secondary computing device to a primary computing device based on a tilt position of the secondary computing device, the method comprises: using a sensor on the secondary computing device to determine that the secondary computing device has a first tilt position, wherein the first tilt position is associated with a non-sharing mode; sensing, by the sensor, that the secondary computing device is tilting from the first tilt position towards a second tilt position, wherein the second tilt position is associated with a full sharing mode; in response to sensing that the secondary computing device is tilting from the first tilt position towards the second tilt position, beginning to share the content item with the primary computing device; continuing to increase an amount of the content item that is shared with the primary computing device as long as the sensor continues to sense that the secondary computing device is tilting from the first tilt position towards the second tilt position; sensing, by the sensor, that the secondary computing device has reached the second tilt position; and sharing the entire content item with the primary computing device. In an example, the the first tilt position is a low angle position. In an example, the second tilt position is a high angle position. In another example, the method further comprises sensing, by the sensor, that the secondary computing device is tilting from the second tilt position towards the first tilt position; in response to sensing that the secondary computing device is tilting from the second tilt position towards the first tilt position, beginning to stop sharing the content item from the primary computing device; continuing to decrease an amount of the content item that is shared with primary computing device as long as the sensor continues to sense that the secondary computing device is tilting from the second tilt position towards the first tilt position; sensing, by the sensor, that the secondary computing device has reached the first tilt position; and stopping sharing of the entire content item with the primary computing device. In an example, the amount of the content item that is shared with the primary device relates to the tilt angle of the secondary device. In yet another example, the secondary device comprises a dual screen mobile device. In an example, a first screen of the dual screen mobile device has a first content item and a second screen of the dual screen mobile device has a second content item, and the method further comprises: sensing, by the sensor, that the dual screen mobile device is tilting from the first tilt position towards a second tilt position, wherein the first and second tilt positions are about a first degree of freedom; determining to share the first content item with the primary computing device based on a degree of rotation of the dual screen mobile device about a second degree of freedom; in response to sensing that the secondary computing device is tilting from the first tilt position towards the second tilt position, beginning to share the first content item with the primary computing device; continuing to increase an amount of the first content item that is shared with the primary computing device as long as the sensor continues to sense that the dual screen mobile device is tilting from the first tilt position towards the second tilt position; sensing, by the sensor, that the dual screen mobile device has reached the second tilt position; and sharing the entire first content item to the primary computing device. In another example, the method further comprises sensing, by the sensor, that the dual screen mobile device has rotated about the second degree of freedom; in response to determining that the dual screen mobile device has rotated about the second degree of freedom: stopping sharing of the first content item with the primary computing; and sharing the second content item with the primary computing device. In another example, the method further comprises stopping sharing of the content item with the primary computing device when the secondary computing device is placed on a stable supporting surface. In an example the method further comprises receiving a selection of the content item from a menu of selectable content items on the secondary computing device.

In accordance with further examples of the present disclosure, a device comprises: a tiltable screen with a sensor; a processor; and memory storing computer executable instructions that when executed by the processor cause the device to: use the sensor on the tiltable screen to determine that the tiltable screen has a first tilt position, wherein the first tilt position is associated with a non-sharing mode; sense, by the sensor, that the tiltable screen is tilting from the first tilt position towards a second tilt position, wherein the second tilt position is associated with a full sharing mode; in response to sensing that the tiltable screen is tilting from the first tilt position towards the second tilt position, begin to share the content item with a computing device; continue to increase an amount of the content item that is shared with the computing device as long as the sensor continues to sense that the tiltable screen is tilting from the first tilt position towards the second tilt position; sense, by the sensor, that the tiltable screen has reached the second tilt position; and in response to the tiltable screen has reaching the second tilt position, share the entire content item with the computing device. In an example, the device further comprises computer executable instructions that when executed by the processor cause the device to: sense, by the sensor, that the tiltable screen is tilting from the second tilt position towards the first tilt position; and in response to sensing that the tiltable screen is tilting from the second tilt position towards the first tilt position, beginning to stop sharing the content item with the primary computing device. In another example, the device further comprises computer executable instructions that when executed by the processor cause the device to lock the tiltable screen in full sharing mode regardless of the tilt position of the tiltable screen. In another example, the device further comprises computer executable instructions that when executed by the processor cause the device to stop sharing of the content item with the computing device when the tiltable screen is placed on a stable supporting surface. In an example, the device further comprises computer executable instructions that when executed by the processor cause the device to receive a selection of the content item from a menu of selectable content items on the tiltable screen.

In accordance with further examples of the present disclosure, a system for sharing content with a primary device, the system comprises a first computing device comprising: a first sensor; a first processor; and first memory storing first computer executable instructions that when executed by the processor cause the first computing device to: use the first sensor on the first computing device to determine that the first computing device has a first tilt position, wherein the first tilt position is associated with a non-sharing mode; sense, by the first sensor, that the first computing device is tilting from the first tilt position towards a second tilt position, wherein the second tilt position is associated with a full sharing mode; and in response to sensing that the first computing device is tilting from the first tilt position towards the second tilt position, begin to share a first content item with the primary computing device. The system also comprises a second computing device comprising: a second sensor; a second processor; and second memory storing second computer executable instructions that when executed by the processor cause the second computing device to: use the second sensor on the second computing device to determine that the second computing device has the first tilt position; sense, by the second sensor, that the second computing device is tilting from the first tilt position towards a second tilt position; and in response to sensing that the second computing device is tilting from the first tilt position towards the second tilt position, beginning to share a second content item with the primary computing device. In an example, the system further comprises first computer executable instructions that when executed by the first processor cause the first computing device to: in response sensing that first computing has reached the second tilt position, share the entire first content item with the primary computing device; and second computer executable instructions that when executed by the second processor cause the second computing device to: in response sensing that second computing has reached the second tilt position, share the entire second content item with the primary computing device. In an example, the first content item and the second content item are displayed side-by-side on the primary computing system. In another example, the system further comprises first computer executable instructions that when executed by the first processor cause the first computing device to receive a pull gesture on the first computing device to pull the second content item from the primary computing device to the first computing device. In yet another example, the system further comprises first computer executable instructions that when executed by the first processor cause the first computing device to set permissions on the first content item that is shared with the primary computing device.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits a number of known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The invention claimed is:

1. A method for sharing a content item from a secondary computing device, including a secondary display screen defining a second plane thereacross, to a primary computing device, including a primary display screen defining a first plane thereacross, based on a tilt position of the secondary computing device, the method comprising:
   using a sensor on the secondary computing device to determine that the secondary computing device has a first tilt position, wherein, in the first tilt position, the second plane is at a first angle, with respect to the first plane, and wherein the first tilt position is associated with a non-sharing mode;
   using the sensor to determine that the secondary computing device is tilting from the first tilt position towards a second tilt position, wherein, in the second tilt position, the second plane is at a second angle, with respect to the first plane, and wherein the second tilt position is associated with a full sharing mode;
   in response to sensing that the secondary computing device is tilting from the first tilt position towards the second tilt position, beginning to share the content item with the primary computing device;
   continuing to increase an amount of the content item that is shared with the primary computing device as long as the sensor continues to sense that the secondary computing device is tilting from the first tilt position towards the second tilt position, the amount being proportional to a third angle, the third angle having a value that is between a value of the first angle and a value of the second angle;
   using the sensor to determine that the secondary computing device has reached the second tilt position; and
   sharing the entire content item with the primary computing device.

2. The method of claim 1 wherein the first tilt position is a low angle position.

3. The method of claim 1 wherein the second tilt position is a high angle position.

4. The method of claim 1 further comprising:
   using the sensor to determine that the secondary computing device is tilting from the second tilt position towards the first tilt position;
   in response to sensing that the secondary computing device is tilting from the second tilt position towards the first tilt position, beginning to stop sharing the content item from the primary computing device;
   continuing to decrease an amount of the content item that is shared with primary computing device as long as the sensor continues to sense that the secondary computing device is tilting from the second tilt position towards the first tilt position;

using the sensor to determine that the secondary computing device has reached the first tilt position; and stopping sharing of the entire content item with the primary computing device.

5. The method of claim 1 wherein the amount of the content item that is shared with the primary device relates to the tilt angle of the secondary device.

6. The method of claim 1 wherein the secondary device comprises a dual screen mobile device.

7. The method of claim 6, wherein a first screen of the dual screen mobile device has a first content item and a second screen of the dual screen mobile device has a second content item, and the method further comprises: using the sensor to determine that the dual screen mobile device is tilting from the first tilt position towards a second tilt position, wherein the first and second tilt positions are about a first degree of freedom;

determining to share the first content item with the primary computing device based on a degree of rotation of the dual screen mobile device about a second degree of freedom;

in response to sensing that the secondary computing device is tilting from the first tilt position towards the second tilt position, beginning to share the first content item with the primary computing device;

continuing to increase an amount of the first content item that is shared with the primary computing device as long as the sensor continues to sense that the dual screen mobile device is tilting from the first tilt position towards the second tilt position;

using the sensor to determine that the dual screen mobile device has reached the second tilt position; and sharing the entire first content item to the primary computing device.

8. The method of claim 7, further comprising:

using the sensor to determine that the dual screen mobile device has rotated about the second degree of freedom;

in response to determining that the dual screen mobile device has rotated about the second degree of freedom:
stopping sharing of the first content item with the primary computing; and
sharing the second content item with the primary computing device.

9. The method of claim 1, further comprising:

stopping sharing of the content item with the primary computing device when the secondary computing device is placed on a stable supporting surface.

10. The method of claim 1, further comprising:

receiving a selection of the content item from a menu of selectable content items on the secondary computing device.

11. A device comprising:

a tiltable screen with a sensor;

a processor; and memory storing computer executable instructions that when executed by the processor cause the device to:
use the sensor on the tiltable screen to determine that the tiltable screen has a first tilt position, wherein the first tilt position is associated with a non-sharing mode;
sense, by the sensor, that the tiltable screen is tilting from the first tilt position towards a second tilt position, wherein the second tilt position is associated with a full sharing mode;
in response to sensing that the tiltable screen is tilting from the first tilt position towards the second tilt position, begin to share the content item with a computing device;
continue to increase an amount of the content item that is shared with the computing device as long as the sensor continues to sense that the tiltable screen is tilting from the first tilt position towards the second tilt position;
sense, by the sensor, that the tiltable screen has reached the second tilt position;
in response to the tiltable screen has reaching the second tilt position, share the entire content item with the computing device;
receive an indication corresponding to locking the tiltable screen; and
lock the tiltable screen in full sharing mode regardless of the tilt position of the tiltable screen.

12. The device of claim 11, further comprising computer executable instructions that when executed by the processor cause the device to:

sense, by the sensor, that the tiltable screen is tilting from the second tilt position towards the first tilt position; and in response to sensing that the tiltable screen is tilting from the second tilt position towards the first tilt position, begin to stop sharing the content item with the primary computing device.

13. The device of claim 11, further comprising computer executable instructions that when executed by the processor cause the device to:

stop sharing of the content item with the computing device when the tiltable screen is placed on a stable supporting surface.

14. The device of claim 11, further comprising computer executable instructions that when executed by the processor cause the device to:

receive a selection of the content item from a menu of selectable content items on the tiltable screen.

15. A system for sharing content with a primary device, the system comprising:

a first computing device comprising:

a first processor; and first memory storing first computer executable instructions that when executed by the processor cause the first computing device to:
use a first sensor on the first computing device to determine that the first computing device has a first tilt position, wherein the first tilt position is associated with a non-sharing mode;
use the first sensor to determine that the first computing device is tilting from the first tilt position towards a second tilt position, wherein the second tilt position is associated with a full sharing mode; and
in response to sensing that the first computing device is tilting from the first tilt position towards the second tilt position, begin to share a first content item with the primary computing device; and a second computing device comprising:

a second processor; and second memory storing second computer executable instructions that when executed by the processor cause the second computing device to:
use a second sensor on the second computing device to determine that the second computing device has the first tilt position;

use the second sensor to determine that the second computing device is tilting from the first tilt position towards a second tilt position; and in response to sensing that the second computing device is tilting from the first tilt position towards the second tilt position, beginning to share a second content item with the primary computing device.

16. The system of claim 15, further comprising:

first computer executable instructions that when executed by the first processor cause the first computing device to:

in response sensing that first computing has reached the second tilt position, share the entire first content item with the primary computing device; and second computer executable instructions that when executed by the second processor cause the second computing device to:

in response sensing that second computing has reached the second tilt position, share the entire second content item with the primary computing device.

17. The system of claim 15, wherein the first content item and the second content item are displayed side-by-side on the primary computing system.

18. The system of claim 15, further comprising:

first computer executable instructions that when executed by the first processor cause the first computing device to:

receive a pull gesture on the first computing device to pull the second content item from the primary computing device to the first computing device.

19. The system of claim 15, further comprising:

first computer executable instructions that when executed by the first processor cause the first computing device to:

set permissions on the first content item that is shared with the primary computing device.

20. The system of claim 1, wherein when the third angle is midway between the first angle and the second angle, half of the content item is shared with the primary computing device to be displayed.

* * * * *